US008473562B2

(12) United States Patent  (10) Patent No.: US 8,473,562 B2
Glasgow  (45) Date of Patent: *Jun. 25, 2013

(54) PERSONAL DIRECTORY SERVICES WITH DIRECTED COMMUNICATION

(71) Applicant: AT&T Intellectual Property I, L.P., Atlanta, GA (US)

(72) Inventor: Jay Oliver Glasgow, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,623

(22) Filed: Nov. 20, 2012

(65) Prior Publication Data

US 2013/0080252 A1  Mar. 28, 2013

Related U.S. Application Data

(63) Continuation of application No. 11/464,091, filed on Aug. 11, 2006, now Pat. No. 8,332,474.

(51) Int. Cl.
  *G06Q 30/00* (2006.01)
  *G06F 15/16* (2006.01)

(52) U.S. Cl.
  USPC ........................................ 709/206; 705/14.51

(58) Field of Classification Search
  USPC .......................................................... 709/206
  See application file for complete search history.

(56) References Cited

U.S. PATENT DOCUMENTS

| 6,622,174 | B1 | 9/2003 | Ukita et al. |
| 6,708,205 | B2 | 3/2004 | Sheldon et al. |
| 6,757,662 | B1 | 6/2004 | Greenwald et al. |
| 7,287,057 | B2 | 10/2007 | Lagarde et al. |
| 7,505,974 | B2 | 3/2009 | Gropper |
| 7,543,005 | B1 | 6/2009 | Edelman et al. |
| 7,562,104 | B2 | 7/2009 | Cadiz et al. |
| 7,738,912 | B1 | 6/2010 | Hawkins et al. |
| 7,836,011 | B2 | 11/2010 | Celik |
| 2001/0032172 | A1 | 10/2001 | Moulinet et al. |
| 2002/0156895 | A1 | 10/2002 | Brown |
| 2002/0187750 | A1 | 12/2002 | Majumdar |
| 2003/0093480 | A1 | 5/2003 | Lagard et al. |
| 2003/0233411 | A1 | 12/2003 | Parry et al. |
| 2004/0003037 | A1 | 1/2004 | Fujimoto et al. |
| 2004/0054691 | A1 | 3/2004 | Sharma et al. |

(Continued)

FOREIGN PATENT DOCUMENTS

| WO | 2008021937 | 8/2007 |
| WO | 2008021939 | 8/2007 |

OTHER PUBLICATIONS

U.S. Office Action dated Jun. 5, 2008 in U.S. Appl. No. 11/464,077.

(Continued)

*Primary Examiner* — Kenny Lin
*Assistant Examiner* — Shaq Taha
(74) *Attorney, Agent, or Firm* — Hartman & Citrin LLC

(57) ABSTRACT

Included are systems and methods for directing data. At least one embodiment of a method includes receiving a listing for a data provider, the listing including a plurality of criteria related to the data provider and receiving an indication to add at least a portion of the listing to a personal directory. Other embodiments include adding at least a portion of the listing to the personal directory and receiving an indication from the data provider to send data to the personal directory.

20 Claims, 29 Drawing Sheets

U.S. PATENT DOCUMENTS

| | | |
|---|---|---|
| 2005/0027716 A1 | 2/2005 | Apfel |
| 2005/0027797 A1 | 2/2005 | San Andres et al. |
| 2005/0076338 A1 | 4/2005 | Malik |
| 2005/0091272 A1 | 4/2005 | Smith et al. |
| 2005/0157858 A1 | 7/2005 | Rajagopalan et al. |
| 2005/0160062 A1 | 7/2005 | Howard |
| 2005/0175160 A1 | 8/2005 | Simpson et al. |
| 2005/0187781 A1 | 8/2005 | Christensen |
| 2005/0198172 A1 | 9/2005 | Appelman et al. |
| 2005/0198545 A1 | 9/2005 | Wieck et al. |
| 2006/0031293 A1 | 2/2006 | Thommes et al. |
| 2006/0041543 A1 | 2/2006 | Achlioptas |
| 2006/0069730 A1 | 3/2006 | Azuma |
| 2006/0080166 A1 | 4/2006 | Takahashi |
| 2006/0123114 A1 | 6/2006 | Aoki et al. |
| 2006/0148477 A1 | 7/2006 | Reilly |
| 2006/0156037 A1 | 7/2006 | Wierderin et al. |
| 2007/0038765 A1 | 2/2007 | Dunn |
| 2007/0067403 A1 | 3/2007 | Holmes |
| 2007/0072591 A1 | 3/2007 | McGary et al. |
| 2007/0143433 A1 | 6/2007 | Daigle |
| 2007/0143475 A1 | 6/2007 | Daigle |
| 2007/0150608 A1 | 6/2007 | Randall |
| 2007/0178889 A1 | 8/2007 | Cortegiano et al. |
| 2007/0219966 A1 | 9/2007 | Baylis et al. |
| 2007/0226357 A1 | 9/2007 | McMurry et al. |
| 2007/0260671 A1 | 11/2007 | Harinstein et al. |
| 2008/0037755 A1 | 2/2008 | Glasgow |
| 2008/0040433 A1 | 2/2008 | Glasgow |
| 2008/0040485 A1 | 2/2008 | Glasgow |
| 2008/0275955 A1 | 11/2008 | Yamazaki et al. |
| 2008/0288586 A1 | 11/2008 | Koch |
| 2009/0135742 A1 | 5/2009 | Fitzpatrick et al. |
| 2010/0293057 A1 | 11/2010 | Haveliwala et al. |

OTHER PUBLICATIONS

U.S. Office Action dated Jan. 13, 2009 in U.S. Appl. No. 11/464,077.
U.S. Office Action dated May 12, 2009 in U.S. Appl. No. 11/464,077.
U.S. Office Action dated Jan. 14, 2010 in U.S. Appl. No. 11/464,077.
U.S. Office Action dated Jul. 18, 2011 in U.S. Appl. No. 11/464,077.
U.S. Office Action dated Dec. 20, 2011 in U.S. Appl. No. 11/464,077.
U.S. Notice of Allowance dated Aug. 8, 2012 in U.S. Appl. No. 11/464,077.
U.S. Office Action dated Jul. 14, 2008 in U.S. Appl. No. 11/464,091.
U.S. Office Action dated Mar. 12, 2009 in U.S. Appl. No. 11/464,091.
U.S. Office Action dated Jul. 16, 2009 in U.S. Appl. No. 11/464,091.
U.S. Office Action dated Jan. 19, 2010 in U.S. Appl. No. 11/464,091.
U.S. Office Action dated May 12, 2011 in U.S. Appl. No. 11/464,091.
U.S. Office Action dated Sep. 12, 2011 in U.S. Appl. No. 11/464,091.
U.S. Notice of Allowance dated Aug. 8, 2012 in U.S. Appl. No. 11/464,091.
U.S. Office Action dated May 27, 2008 in U.S. Appl. No. 11/464,071.
U.S. Office Action dated Jan. 12, 2009 in U.S. Appl. No. 11/464,071.
U.S. Office Action dated May 5, 2009 in U.S. Appl. No. 11/464,071.
U.S. Office Action dated Feb. 1, 2010 in U.S. Appl. No. 11/464,071.
U.S. Office Action dated May 12, 2011 in U.S. Appl. No. 11/464,071.
U.S. Office Action dated Sep. 21, 2011 in U.S. Appl. No. 11/464,071.
U.S. Notice of Allowance dated Apr. 26, 2012 in U.S. Appl. No. 11/464,071.
U.S. Notice of Allowance dated Oct. 4, 2012 in U.S. Appl. No. 11/464,071.
International Search Report & Written Opinion dated Jun. 19, 2008 in PCT Application No. PCT/US07/75554.
International Search Report & Written Opinion dated Jun. 18, 2008 in PCT Application No. PCT/US07/75557.

PERSONAL DIRECTORY SERVICES WITH DIRECTED COMMUNICATION

CROSS REFERENCE

This application is a continuation of U.S. application Ser. No. 11/464,091, now U.S. Pat. No. 8,332,474, entitled "Personal Directory Services with Directed Communication," filed on Aug. 11, 2006, which is related to U.S. application Ser. No. 11/464,071, now U.S. Pat. No. 8,375,088, entitled "Customizable Personal Directory Services," filed on Aug. 11, 2006 and U.S. application Ser. No. 11/464,077, now U.S. Pat. No. 8,335,825, entitled "Personal Directory Services with Presence Indication" filed Aug. 11, 2006, each of which is hereby incorporated by reference in its entirety.

BACKGROUND

With the advent of the Internet, different forms of digital communications have recently emerged. Examples of such digital communications include email and instant messaging (IM). Often, users utilize these digital communications in conjunction with an address book. In many scenarios, users can be given the ability to store various contacts in a localized address book that is available from one or more locations. Additionally, users can create a "filtered Yellow pages," which can allow the user to store contact information for various people and businesses in a centralized address book. While this functionality can be helpful to users, the functionality is often limited to search and store. Users often desire the ability to easily contact the people and businesses in their filtered yellow pages, as well as receive data from those people and businesses.

Thus, a heretofore unaddressed need exists in the industry to address the aforementioned deficiencies and inadequacies.

SUMMARY

Included are systems and methods for directing data. At least one embodiment of a method includes receiving a listing for a data provider, the listing including a plurality of criteria related to the data provider and receiving an indication to add at least a portion of the listing to a personal directory. Other embodiments include adding at least a portion of the listing to the personal directory and receiving an indication from the data provider to send data to the personal directory.

Also included are embodiments of a computer readable medium for directing data. At least one embodiment of a computer readable medium includes logic configured to receive a listing for a data provider, the listing including a plurality of criteria related to the data provider and logic configured to receive an indication to add at least a portion of the listing to a personal directory. Other embodiments include logic configured to add at least a portion of the listing to the personal directory and logic configured to receive an indication from the data provider to send data to the personal directory.

Additionally included are embodiments of a server device for directing data. At least one embodiment of a server device includes listing logic configured to receive a listing for a data provider, the listing including a plurality of criteria related to the data provider and indication logic configured to receive an indication to add at least a portion of the listing to a personal directory. Other embodiments include addition logic configured to add at least a portion of the listing to the personal directory and sending logic configured to receive an indication from the data provider to send data to the personal directory.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
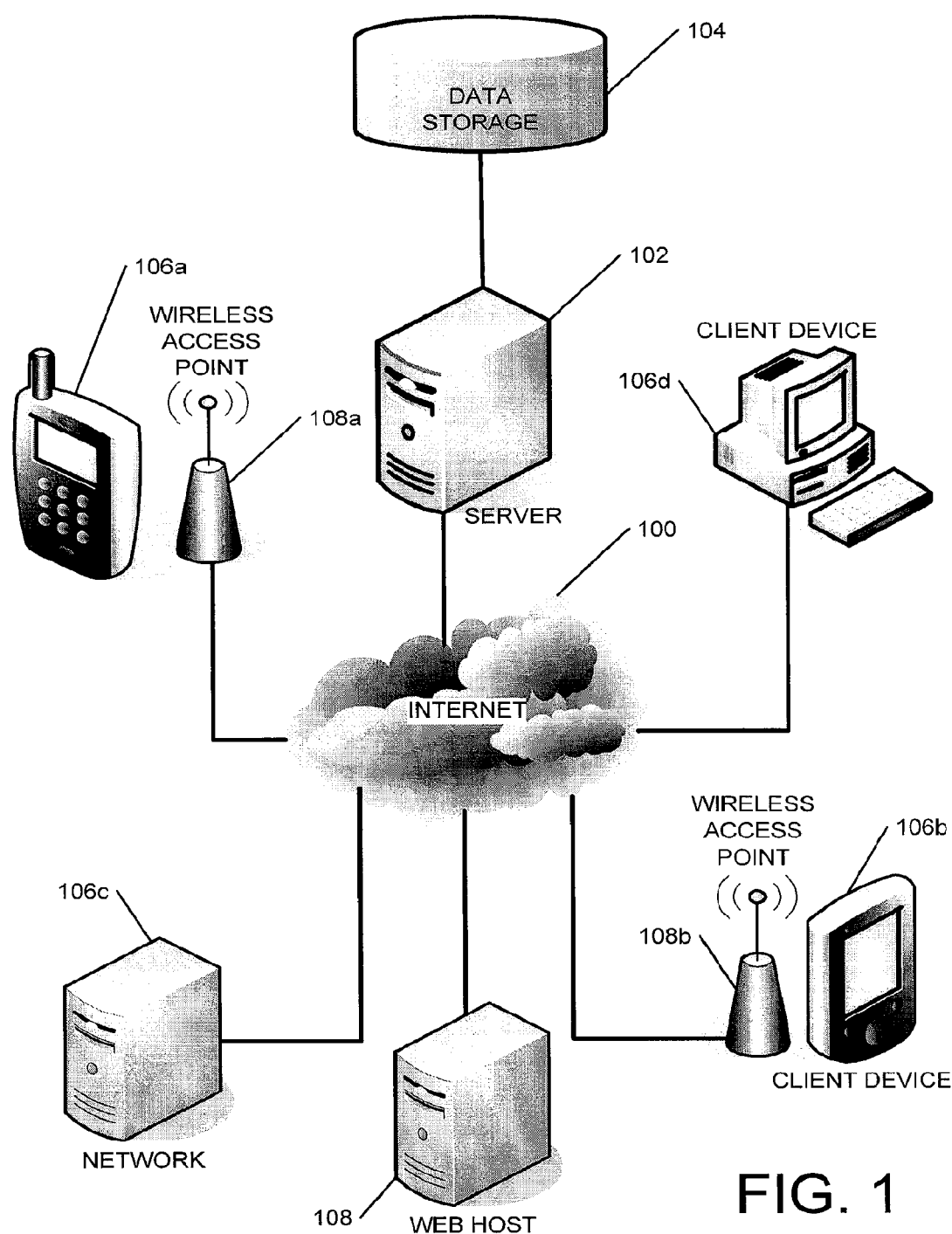
FIG. 1 is a functional diagram of an exemplary instant messaging network environment.

FIG. 1 is a functional diagram of an exemplary network environment. As illustrated, a plurality of users may be connected via an external network such as Internet 100 or other communications network. The users may access the Internet 100 via client devices 106a (via wireless access point 108a), 106b (via wireless access point 108b), 106c, and 106d. The client devices may include, for example, portable communication devices 106a and 106b, a local network 106c and/or a personal computer 106d. It should be appreciated that the external network, client devices and connections illustrated in FIG. 1 are shown by way of example, but this disclosure is not limited to these examples. The disclosure may be applicable to any client device, connection, and external network that supports messaging and/or other communication services. Additionally included in this nonlimiting example is a server 102 that is coupled to a data storage unit 104.

To initiate an instant messaging session, a user may activate instant messaging client software that is stored on the user's client device 106a. Activation of the instant messaging client software can facilitate a connection request with the server 102, which may be a dedicated instant messaging server. The server 102 can then authenticate the user via any of a number of authentication techniques including, but not limited to technologies related to a user identification (USERID) and password and various biometric authentication processes. According to an exemplary embodiment, the authentication process includes the server receiving data (such as a USERID and password) and comparing that data with data stored on data storage 104 (data storage logic, database, and/or authentication server). If data submitted by the user matches the data stored in data storage 104, the user can be authenticated and granted access to instant messaging services.

Once the user has been authenticated, the user can send an instant message to any of his or her contacts (e.g., persons to whom the user communicates). According to an exemplary embodiment, the user can send an instant message to anyone who has an account with the server 102. If the user knows the desired recipient's account name, handle, or instant message identification (IMID) associated with the server 102, the user can send an instant message to that recipient. In many circumstances, the user will have the user's contacts saved on instant messaging client software or on the server 102 such that the user does not have to re-enter the account name each time the user wishes to send an instant message.

Additionally, the server 102 can keep track of the various users that are currently logged onto the server and provide presence information regarding the user's contacts. Thus, if a user wishes to send an instant message to a recipient, the server 102 can send information as to whether that contact is currently logged onto the server. Upon receiving presence data related to the user's contacts, the user can then send an instant message to a recipient (whose presence is known), thereby beginning an instant messaging chat session. While the server 102 can monitor presence data for each user associated with the server 102, other implementations can provide that logic on user device 106 determines the user's presence. The user's client device 106 can then communicate this data to the server 102 for transmission to other users.

In at least one instant messaging environment, each message sent between the user and the contact can be communicated through the server 102. In such a scenario, the user at client device 106a can compose and send an instant message that is directed from the user's client device 106a to the wireless access point 108a, and then to the Internet 100. The message can then be sent to the server 102 back through the Internet 100 to the recipient's client device 106b. Other embodiments can provide that the server 102 initiate a communication between users, however once the communication is established, the server 102 can be removed from the communication such that the users can communicate directly.

Additionally, while some instant messaging environments have a dedicated instant messaging server (or servers), others may use general purpose devices of varying capabilities to manage instant messaging traffic as well as perform other tasks. Further, while this nonlimiting example discusses a proprietary instant messaging environment, one should note that this disclosure also contemplates an environment utilizing a universal instant messaging protocol, or a communications environment that facilitates communication across a plurality of different instant messaging services using a plurality of different instant messaging protocols.

Also included in the nonlimiting example of FIG. 1 is a web host 108. Web host 108 can be configured to provide a web site to users via an external network, such as the Internet 100. As a nonlimiting example, a user, such as a user operating client device 106d can receive data from web host 108 via the Internet 100. The web host can include a web server, application server, or other device (or any permutation thereof) to provide the desired information efficiently.

Figure 2:
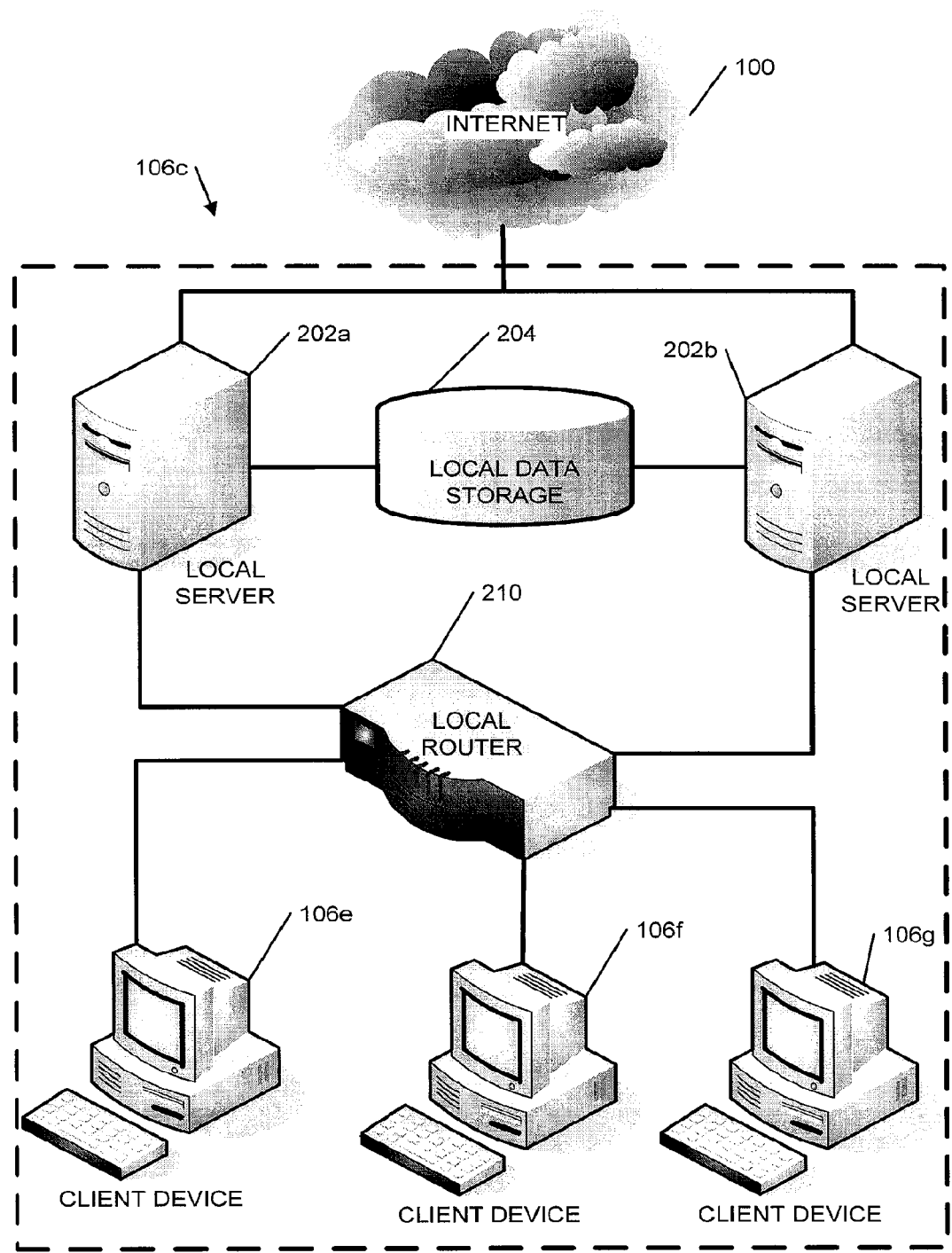
FIG. 2 is a functional diagram of an exemplary local network environment by which a user can send an instant message, similar to the environment from FIG. 1.

FIG. 2 is a functional diagram of an exemplary local network environment, similar to the environment from FIG. 1. The local network environment of FIG. 2 can be a home network, a business network or other network configured to facilitate communication between users. As illustrated, client devices 106e, 106f, 106g are coupled to a local router 210. This coupling may be wire-line or wireless. Though depicted as personal computers, the client devices 106e, 106f, and 106g may be implemented with any device capable of accessing the Internet 100 and supporting instant messaging in a local network. The local router 210 is coupled to local server 202a and local server 202b. The local servers 202a, 202b (collectively referred to as local server 202) are coupled to local data storage 204. Though two local servers are shown in FIG. 2 for ease of illustration, it will be appreciated that more or fewer than two local servers may be used. The local servers 202 are also coupled to an external network, such as the Internet 100.

In this exemplary networking environment a user located at client device 106e may desire to send an instant message to a recipient located at client device 106g. In the networking environment of FIG. 2, the user at client device 106e can compose and send the instant message via client software stored on the client device 106e. The message can then be sent from the client device 106e to the local router 210. The local router can then send the message to one of the local servers 202. The local server 202 can communicate the message back through the local router 210 to the intended recipient located at client device 106g.

As the nonlimiting example of FIG. 2 illustrates, in some embodiments communication of data can be internal to the local network 106c, without the use of an external network, such as the Internet 100. As stated above, such a configuration may be desirable for a business that wishes to facilitate communication between employees, but not to the Internet community at large. Such a configuration may use its own instant messaging protocol, a universal instant messaging protocol, or a proprietary instant messaging protocol.

Additionally, while the configuration of FIG. 2 facilitates intra-network instant messaging, this configuration can also facilitate inter-network instant messaging, similar to the configuration from FIG. 1. In such a scenario, a user operating client device 106f can send and receive messages to a contact that is not located within the local network of FIG. 2. The message can be sent through local router 210 to local server 202. From local server 202, the message can be sent to an external network, such as the Internet 100.

Referring back to FIG. 1, the message can then be sent from the network 106c to server 102 (which is not part of the local network in FIG. 2), and then back through the Internet 100 to client device 106b. The contact that is operating client device 106b can then reply through the same channels. More specifically, the reply message can be sent from 106b through the Internet 100 to the server 102, back through the Internet 100, to the network 106c (to FIG. 2), to the local server 202, through the local router 210, and back to the user at client device 106f.

One should note that the configuration of FIG. 2 is a nonlimiting example. Components can be added or removed (or both) without diverging from the scope of this disclosure. Additionally, although the configurations from FIGS. 1 and 2 are illustrated as various examples of instant messaging configuration, these are not meant to be limiting. More specifically, in at least one configuration, instant messages sent between unrelated users need not use the Internet 100. Two users that are engaged in an instant messaging chat session on the same Internet Service Provider (ISP) may not require the use of the Internet 100 to facilitate the communication. As the ISP can link a user to the Internet 100, two users operating on the same ISP may simply use the ISP to facilitate the communication. In such a scenario, the configuration of FIG. 2 becomes more applicable, even for users who are not otherwise related. Additionally, if a company has multiple offices, use of the Internet 100 for instant messaging communications may be desired, and may be implemented similar to the configuration of FIG. 1.

Additionally, as one of ordinary skill in the art will understand, access to web site data or similar information can be available to users of client devices 106e, 106f, and 106g. While this data may be available locally (within the network configuration of FIG. 2), as one will understand, this data can be available to any of a plurality of users via an external network, such as the Internet.

Figure 3:
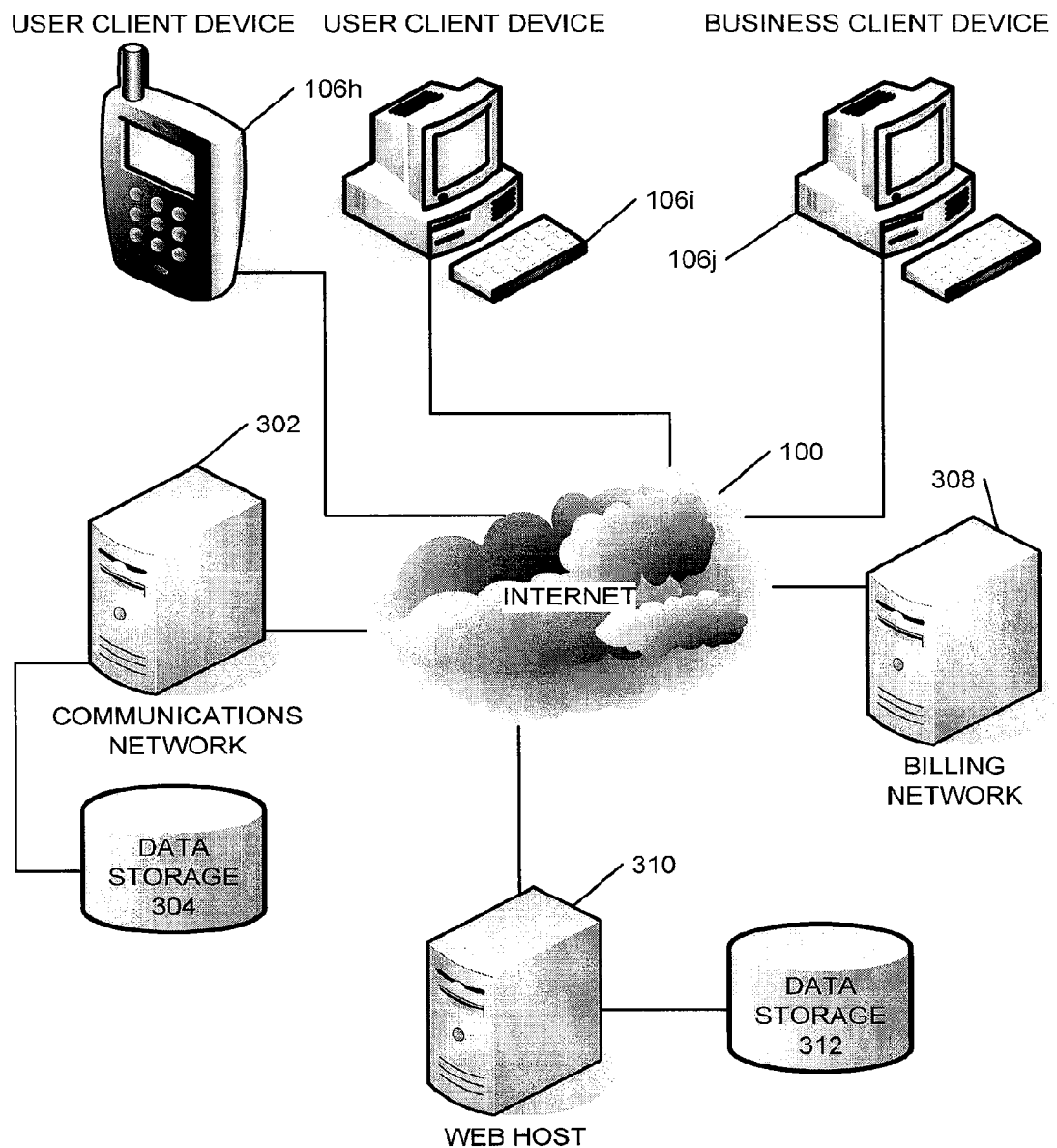
FIG. 3 is an exemplary network configuration illustrating instant messaging network components, as well as web site network components, similar to the network configuration from FIG. 1.
Figure 5:
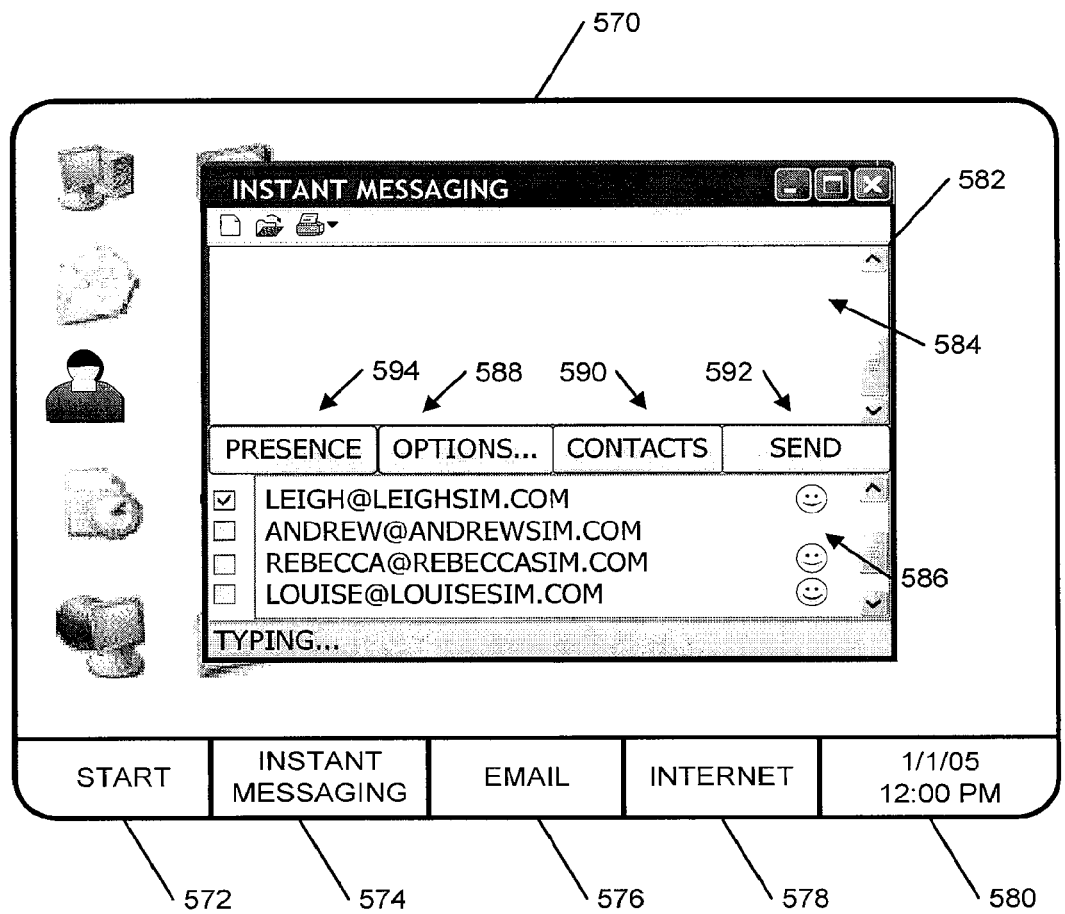
FIG. 5 is an exemplary display of a first user's instant messaging window, pursuant to the instant messaging software illustrated in FIG. 4.
Figure 6:
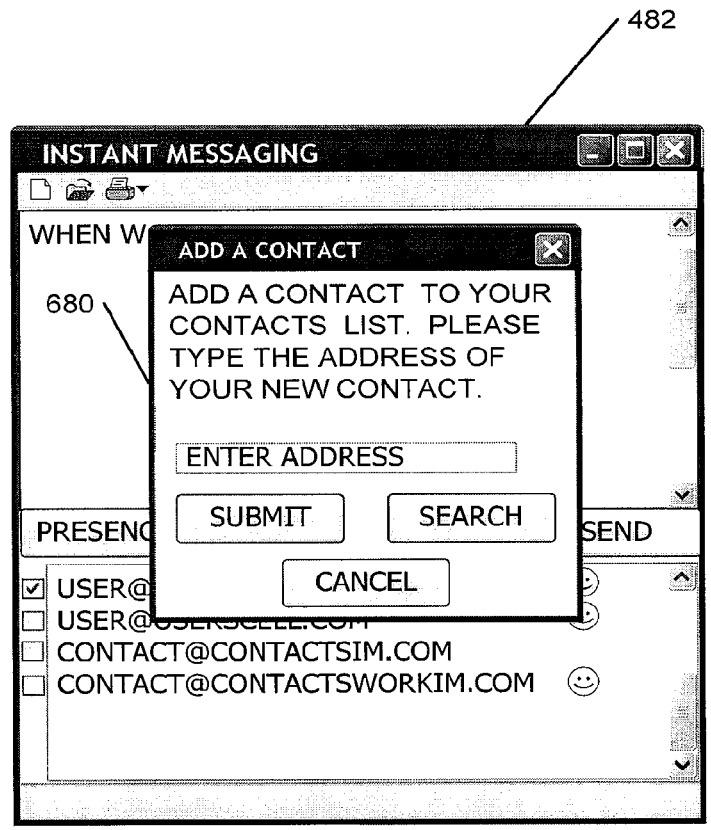
FIG. 6 is an exemplary display of a first user's instant messaging window, illustrating an option to add a second user to a buddy list, similar to the display from FIG. 5.
Figure 7:
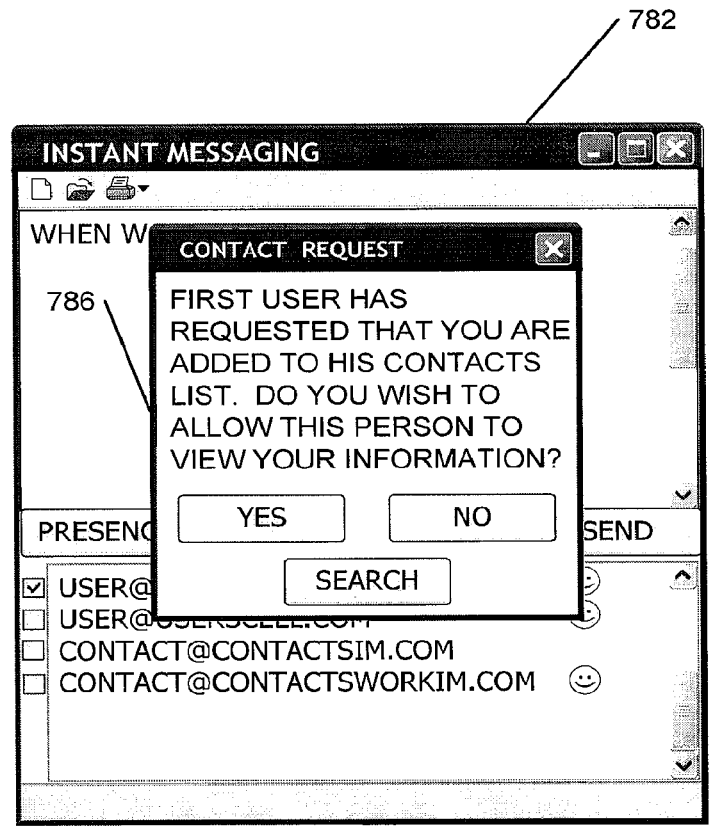
FIG. 7 is an exemplary display of a second user's instant messaging window, providing the second user with the ability to determine whether presence information is exchanged with the first user, pursuant to the display from FIG. 6.

FIG. 3 is an exemplary network configuration illustrating instant messaging network components, as well as web site network components, similar to the network configuration from FIG. 1. As illustrated in FIG. 3, client devices 106h, 106i, and 106j are coupled to external network 100. Users at these devices can communicate via instant messaging, email, etc. via communications network 302. The communications network 302 can provide communications services to the users at client devices 106. As a nonlimiting example, communications network 302 can include a dedicated instant messaging server for providing instant messaging capabilities between users. As illustrated in FIGS. 5-7, two users can communicate, and otherwise exchange information (such as presence data). Coupled to the communications network is data storage 304, which can be configured to store data related to the communications network 302. The data storage 304 can include user-related data, however this is not a requirement. One should note that other embodiments of communications network 302 include one or more instant messaging servers, one or more email servers, as well as other network components that can be configured to facilitate communications between users.

Also included in the nonlimiting example of FIG. 3 is a web host 310, similar to the web host from FIG. 1. Coupled to the web host is data storage 312, which can store data associated with the hosted web site. Coupled to external network 100 is a billing network 308.

Figure 4:
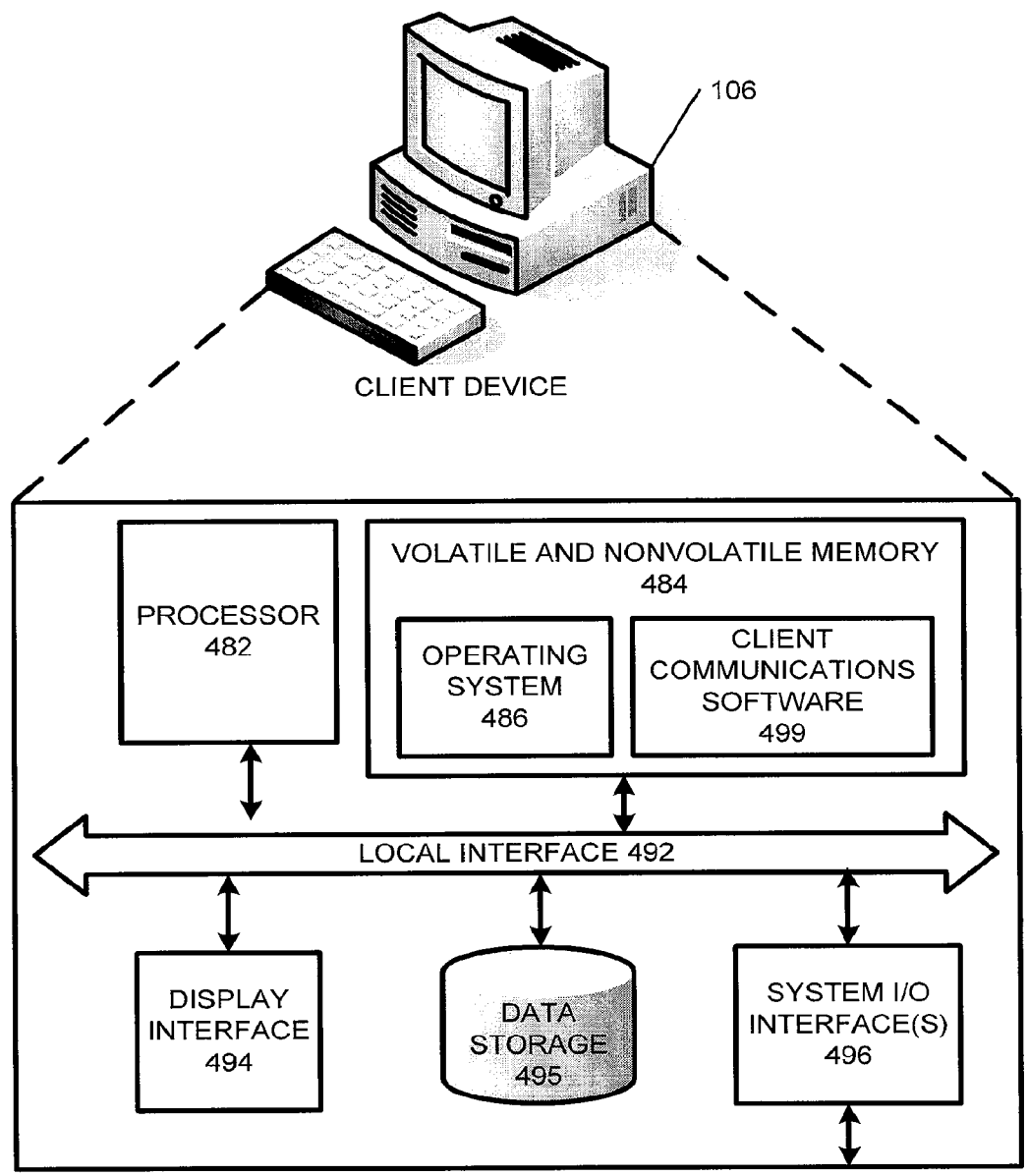
FIG. 4 is a functional diagram illustrating an exemplary embodiment of a client device that may be configured to communicate via a communications network, such as the networks from FIGS. 1, 2, and 3.

In operation, a user operating client device 106h can facilitate an instant messaging session with a user operating client device 106i. In such a scenario, the instant messaging portion of client communications software 499 (as shown in FIG. 4) can log the user onto the instant messaging portion of communications network 302 through, for example, a Jabber® construct. The client communications software 499 can then retrieve and display the user's contacts' presence information. Additionally, if a user coupled to client device 106h wishes to view a website, such as a My Yellow Pages web site, the user can access the Internet using a web browser portion of client communications software 499. The browse portion of client communications software 499 can facilitate display of the web site data on the user's client device 106h. Additionally, as the user selects entries to save in the user's My Yellow Pages, the web host 310 facilitates storage of that data on data storage.

As discussed in more detail below, if a user desires to automatically contact a representative related to one of the entries in the user's My Yellow Pages, the user can be provided with the ability to automatically launch an instant messaging session. In such a scenario, the browser portion of client communications software 499 can receive data from web host 310 indicating that an instant messaging session with the selected business will begin. At that point, the instant messaging portion of client communications software 499 can launch the instant messaging interface with a communications request to the business client device 106*j*. The business client device 106*j* can include an instant messaging logic with similar functionality to the user's instant messaging logic, however, the instant messaging logic associated with the business client device 106*j* can be configured to prevent communication of the user's presence data. More specifically, while the user and the business can communicate via instant messaging, the business's instant messaging logic can be configured to prevent the display of presence information related to the user.

In another nonlimiting example, the business associated with business client device 106*j* may desire to send data, such as advertisements, to various users, such as users associated with client devices 106*h* and 106*i*. While the description that follows is directed to the directed delivery of advertisements as an example, it should be appreciated that other types of data may be delivered in a similar manner. In such a scenario, the business client device 106*j* can facilitate transmission of a request to the web host. In addition to that request, data can also be sent to billing network 308 to document the charges associated with the requested service. Once the request for sending advertisements is received by the web host, the web host can facilitate creation or transmission (or both) of the requested advertisement.

FIG. 4 is a functional diagram illustrating an exemplary embodiment of a client device that may be configured to communicate via a communications network such as the networks from FIGS. 1, 2, and 3. Although a wire-line client device is illustrated, this discussion can be applied to any device. According to an exemplary embodiment, in terms of hardware architecture, as shown in FIG. 4, the client device 106 includes a processor 482, volatile and nonvolatile memory 484, a display interface 494, data storage 495, and one or more input and/or output (I/O) device interface(s) 496 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the client device 106, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc., or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482.

The software in volatile and nonvolatile memory 484 may include one or more separate programs, each of which includes an ordered listing of executable instructions for implementing logical functions. In the nonlimiting example of FIG. 4, the software in the volatile and nonvolatile memory 484 may include client communications software 499, as well as an operating system 486. Client communications software 499 can include email logic, instant messaging logic, web browsing logic, Voice over IP (VoIP) logic, web conferencing logic, or other logic (or any permutation thereof). Additionally, while client communications software 499 is illustrated as a single logic block, this is but a nonlimiting example, as client communications logic can include one or more discrete logical components that can be implemented in software, hardware, firmware, etc.

Similarly, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 486 essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System 486.

The Input/Output devices that may be coupled to system I/O Interface(s) 496 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device 106 is a personal computer, workstation, or the like, the software in the volatile and nonvolatile memory 484 may further include a basic input output system (BIOS) (omitted for simplicity). The BIOS is a set of software routines that initialize and test hardware at startup, start the Operating System 486, and support the transfer of data among the hardware devices. The BIOS is stored in ROM so that the BIOS can be executed when the client device 106 is activated.

When the client device 106 is in operation, the processor 482 is configured to execute software stored within the volatile and nonvolatile memory 484, to communicate data to and from the volatile and nonvolatile memory 484, and to generally control operations of the client device 106 pursuant to the software. Software in memory, in whole or in part, is read by the processor 482, perhaps buffered within the processor 482, and then executed.

FIG. 5 is an exemplary display of a first user's instant messaging window, pursuant to the instant messaging logic illustrated in FIG. 4. As illustrated, the desktop display 570 can include a "START" option 572, an "INSTANT MESSAGING" taskbar menu item 574, an "EMAIL" taskbar menu item 576, an "INTERNET" taskbar menu item 578, and a Date and Time indicator 580. As one of ordinary skill in the art will understand, the taskbar menu items can be linked to various software programs that are currently open on the client device 106. As a nonlimiting example, the client communications software 499, which is facilitating display of instant messaging window 582, relates to the taskbar menu item 574. By selecting the "INSTANT MESSAGING" taskbar menu item 574, the first user can display and remove the instant messaging window 582 from the desktop display 570.

As also illustrated, the instant messaging window 582 includes a text prompt 584 for the first user to enter a message. The input box 584 can be configured to display both outgoing messages and incoming messages. As such, a history (thread) of the current instant messaging session can be documented. A contact can be chosen by selecting the checkbox next to the desired contact (or contacts) in the contact section 586 of the instant messaging window 582. Additionally in contact section 586 is a presence icon associated with each contact that is present (logged onto the instant messaging server 102). As discussed above, the server 102 can determine which users are currently logged onto the server and can display this information to contacts of that user. In this nonlimiting example, the contacts "Leigh," "Rebecca," and "Louise" are currently logged onto the server, while "Andrew" is not logged onto the server. While the nonlimiting example of FIG. 4 includes presence icons for "present" and "not present" other presence statuses can also be provided.

Additionally included in the instant messaging window 582 are a "PRESENCE" option 594, an "OPTIONS . . . " option 588, a "CONTACTS" option 590, and a "SEND" option 592. The "PRESENCE" option 594 can provide the first user with the ability to determine presence settings. The "OPTIONS . . . " option 588 can provide the user access to various options related to the display of the instant messaging window 582, sending options, receiving options, etc. The "CONTACTS" option 590, on the other hand can provide the first user with data related to the first user's contacts and the contacts' presence. The "SEND" option 592 is an action option that executes sending of a message to the instant messaging recipient or recipients.

FIG. 6 is an exemplary display of a first user's instant messaging window, illustrating a window to add a second user to a buddy list, similar to the display from FIG. 5. As an exemplary embodiment, the first user can access the CONTACTS option 590 from FIG. 5. By selecting this option, the first user can add a contact to the contacts section 586. Upon selecting the CONTACTS option 590, the "add a contact" window 680 is displayed. The "add a contact" window 680 includes text (or other data) for instructing the user to add a contact. In this nonlimiting example, the instruction indicates that the first user is to enter an instant messaging, email, or other address associated with the desired contact. Upon entering the address, the first user can select the submit option. If the first user changes his or her mind, the first user can select the cancel option. If the user does not know the desired contact's address, the first user can search by selecting the search option.

FIG. 7 is an exemplary display of a second user's instant messaging window, providing the second user with the ability to determine whether presence information is exchanged with the first user, pursuant to the display from FIG. 6. As illustrated in this exemplary embodiment, upon the first user adding the second user as a contact, the second user's instant messaging user interface 782 provides the second user with a contact request window 786. The contact request window 786 indicates to the second user that the first user has added the second user as a contact. Additionally, the contact request window 786 provides the second user with the option of providing the first user with presence data related to the second user. If the second user permits the first user the ability to view the second user's presence data, the second user can select the yes option. If the second user does not wish to allow the first user access to the second user's presence data, the second user can select the no option. If the second user desires more information regarding the first user, the second user can select the search option. Additional options that can be included are the ability for the second user to add the first user as a contact. Regardless, there is generally a reciprocation of presence access when contacts are created.

In the description that follows, terminology such as "Yellow Pages" is used to refer to a listing of business contacts and advertisers. It should be appreciated, however, that the intention is not limited to business contacts and advertisers but may also be applicable to other contacts (e.g., personal contacts and data providers).

Figure 8:
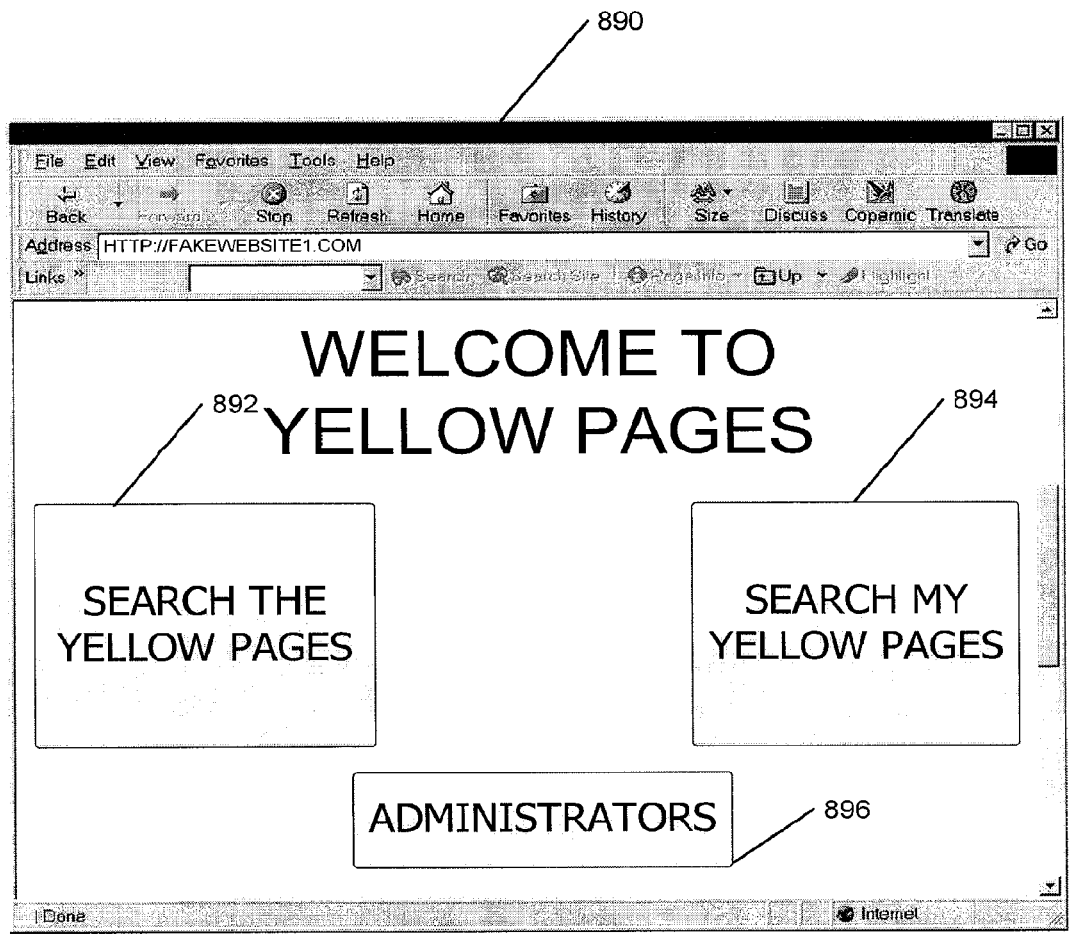
FIG. 8 is an exemplary display of a Yellow Pages website, which can be displayed on the client device from FIG. 4.

FIG. 8 is an exemplary display of a "Yellow Pages" website, which can be displayed on the client device from FIG. 4. While the display depicts a "Yellow Pages" website for ease of illustration, it should be appreciated that the website may be any website containing similar content as that depicted and described with reference to FIG. 8. As illustrated, the exemplary web browser interface 890 is displaying the "Yellow Pages" web site. Included in this display is a "search the yellow pages" option 892, a "search my yellow pages" option 894, and an "administrators" option 896.

Figure 9:
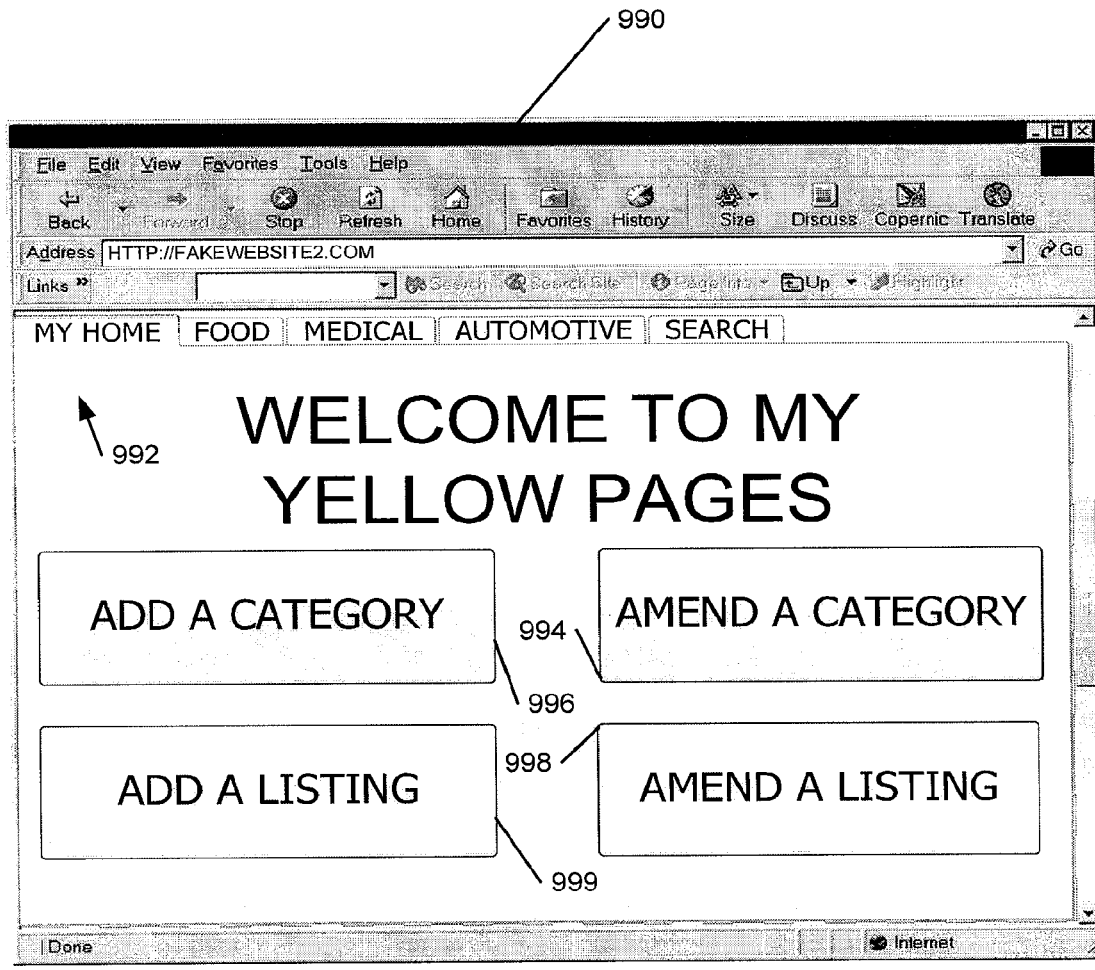
FIG. 9 is an exemplary display of a My Yellow Pages web page, which may be accessed from the Yellow Pages web site from FIG. 8.

FIG. 9 is an exemplary display of a "My Yellow Pages" web page, which may be accessed from the Yellow Pages web site from FIG. 8. Again, the term "My Yellow Pages" is used for illustrative purposes. It should be appreciated that the web page accessed may be any web page containing similar content to that depicted in and described with reference to FIG. 9. The exemplary web browser interface 990 includes a plurality of tabs (which can be user-created or created by the web site) for organizing the user's "My Yellow Pages." In at least one exemplary embodiment, the user can create a Food tab for those entries related to food, a medical tab for those entries related to medicine, an automotive tab for those entries related to automobiles, and a search tab for searching entries that are currently part of the My Yellow Pages listings. Additional tabs may be created for further organizing the user's entries.

As illustrated in the nonlimiting example of FIG. 9, the My Home tab is selected and provides the user with options related to further customizing the user's My Yellow Pages. In this nonlimiting example, the options provided include "add a category" option 996, "amend a category" option 994, "add a listing" option 999, and "amend a listing" option 998.

Figure 10:
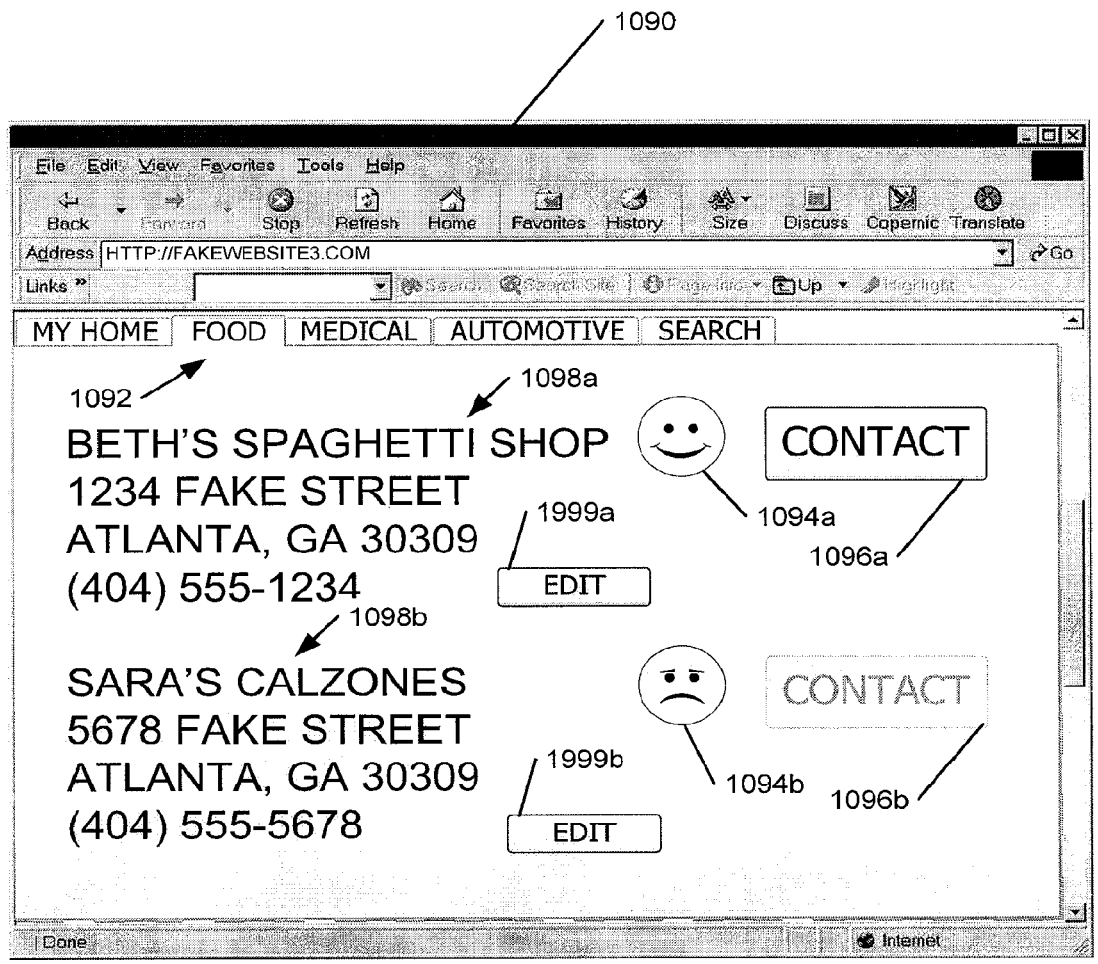
FIG. 10 is an exemplary display of various contacts that can be stored in a My Yellow Pages web page, which may be accessed from the Yellow Pages web site from FIG. 8.

FIG. 10 is an exemplary display of various contacts that can be stored in a My Yellow Pages web page, which may be accessed from the Yellow Pages web site from FIG. 8. As illustrated in this exemplary embodiment, web browser interface 1090 includes the tabs included in FIG. 9, with the food tab 1092 being selected. Under the food tab, "Beth's Spaghetti Shop" 1098a is included, as well as "Sara's Calzones" 1098b. Associated with Beth's Spaghetti Shop 1098a is a presence icon associated with that business. More specifically, the web site can monitor the instant messaging presence of a representative of Beth's Spaghetti Shop. If a representative is currently online (and present), a user who has included Beth's Spaghetti Shop in the user's My Yellow Pages can contact the representative. In such a scenario, the user can select the "contact" option 1096a, which can facilitate activation of the user's instant messaging client (which can be associated with client communications software 499). The user's instant messaging client can then facilitate an instant messaging session with the business's instant messaging client.

Similarly, as illustrated in FIG. 10, Sara's Calzones 1098b is not currently present on instant messaging, as indicated by presence icon 1094b. As such, the contact option 1096b is inactive. While this illustrates that the user cannot currently contact Sara's Calzones, as one of ordinary skill in the art will appreciate, other options can be provided, such as permitting the user to send an email, make a phone call (PSTN based, VoIP based, or other), or otherwise contact Sara's Calzones.

One should note that in at least one embodiment, the My Yellow Pages web page may be configured such that if information (and/or advertisements) related to an advertiser is amended and/or updated, this change can also be reflected in the web browser user interface 1090. Additionally, in at least one embodiment, the user may be provided with the ability to arrange the contacts in any order. Additionally, in at least one embodiment, the user may be provided with the ability to arrange the contacts in any order as well as amend and/or remove a contact by selecting the edit option 1999a, 1999b.

Figure 11:
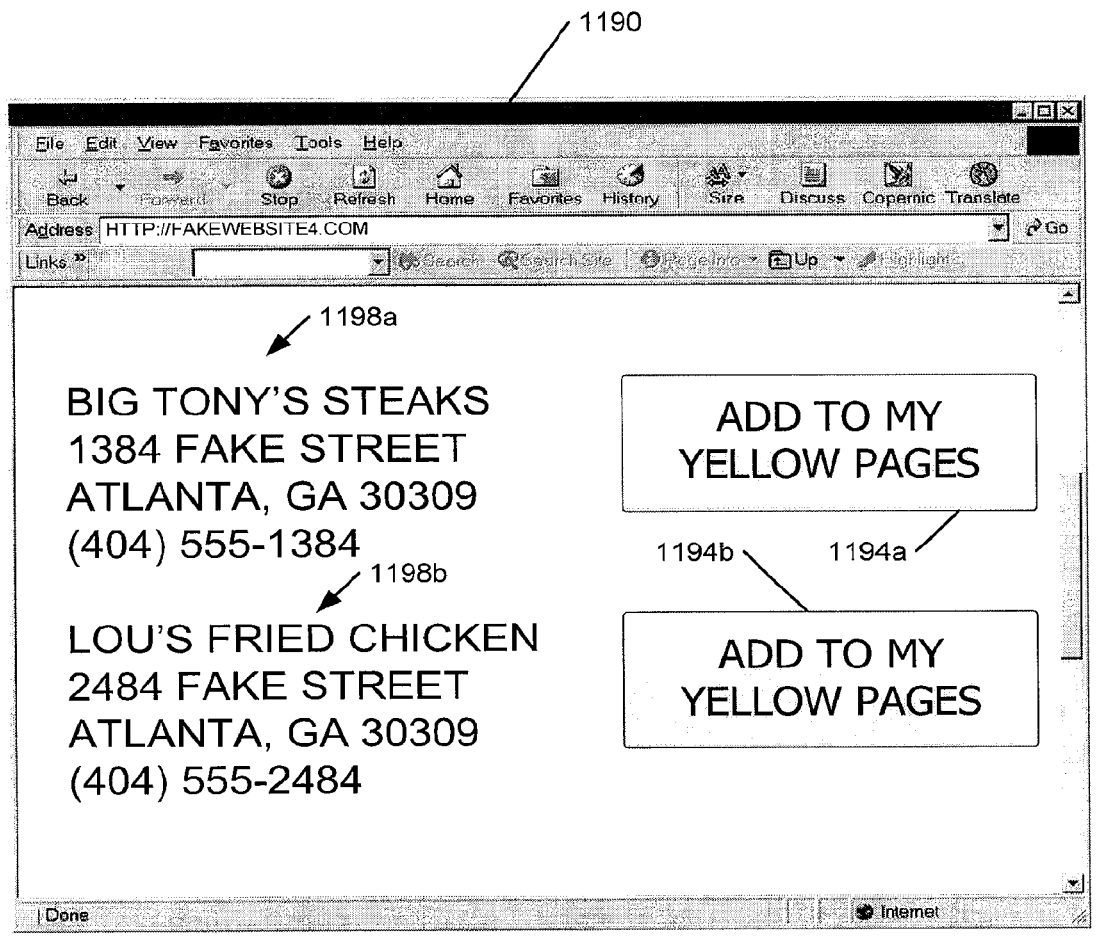
FIG. 11 is an exemplary display of various contacts that can be stored in the My Yellow Pages directory from FIG. 9.

FIG. 11 is an exemplary display of various contacts that can be stored in the My Yellow Pages directory from FIG. 9. As illustrated in this nonlimiting example, browser interface 1190 includes a plurality of yellow page listings that may be displayed by selecting the "search the yellow pages" option from FIG. 9. Upon selecting this option from FIG. 9, the user can be provided with a search form (not shown). The search form can include a search field, an address field, a business type field, a proximity field, or other criteria (or any permutation) that can facilitate location of the desired entry. Depending on the search criteria utilized, one or more entries can be displayed, as illustrated in FIG. 11.

As shown, FIG. 11 includes two entries 1198a, 1198b that include business name, address, and telephone number. Other information can also be displayed, such as email address, instant messaging address, hours of operation, logos, trademarks, and other information. Additionally included in this nonlimiting example is an "add to my yellow pages" 1194a, 1194b option for each entry. By selecting the "add to my yellow pages" option 1194a, 1194b, at least a portion of the information displayed for the entries 1198a, 1198b can be sent to the My Yellow Pages portion of the web site (and in at least one embodiment stored in data storage 312). Depending on the particular configuration, upon selecting the "add to my yellow pages" option 1194a, 1194b, the user can be provided with further options for customizing the added entry. More specifically, the user can be provided with options such as an option to select the folder for the current entry, an option for storing only a portion of the data, an option for creation of a new folder of the current entry, etc.

Figure 12:
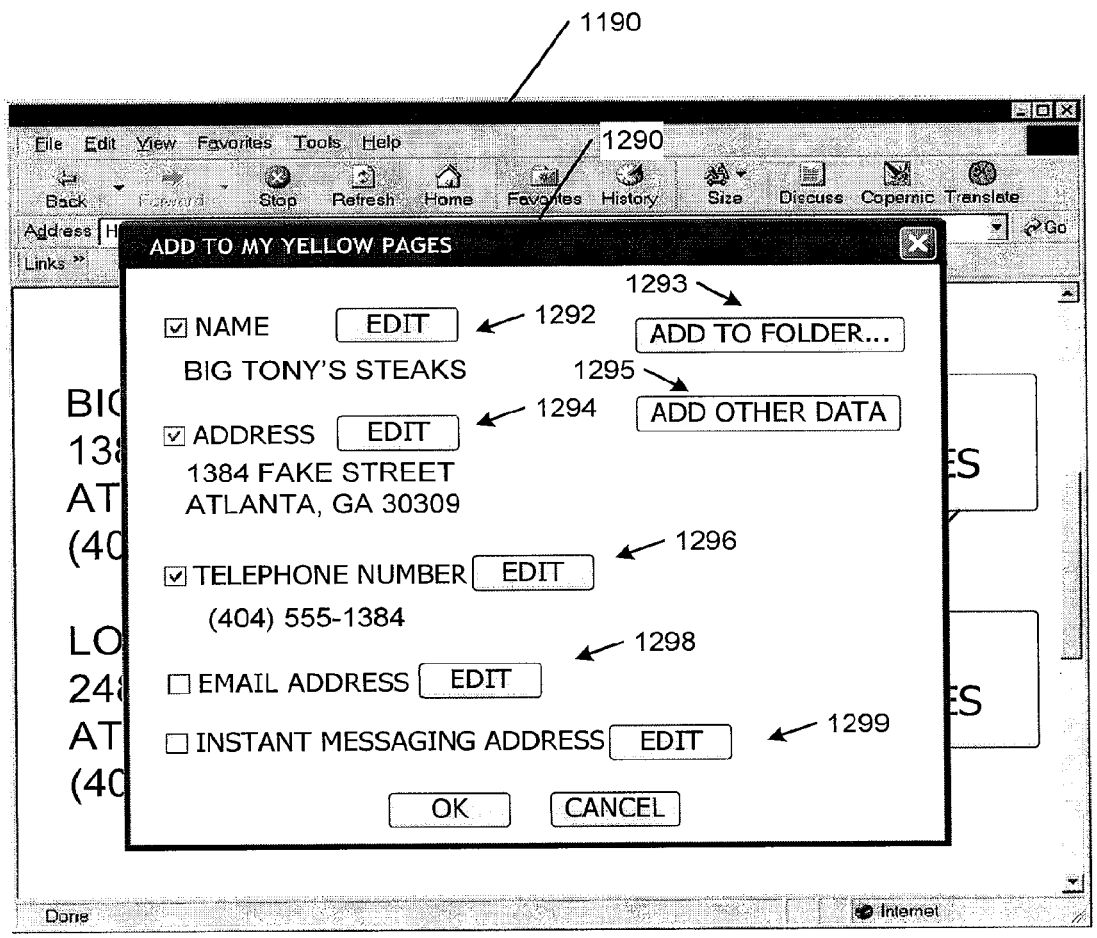
FIG. 12 is an exemplary display of an interface for adding information to a directory in response to selecting the Add to My Yellow Pages option from FIG. 11.

FIG. 12 is an exemplary display of an interface for adding information to a directory in response to selecting the Add to My Yellow Pages option from FIG. 11. More specifically, in response to selecting the Add to My Yellow Pages option 1194a, an Add to My Yellow Pages window 1290 can be displayed to the user. The Add to My Yellow Pages window 1290 can include any of a plurality of information related to the selected advertiser from FIG. 11. While the listing from FIG. 11 may display certain data, more or less data may be displayed in window 1290. Additionally, each advertiser may have different types of data displayed in window 1290.

In this nonlimiting example, window 1290 includes a name option 1292, an address option 1294, a telephone number option 1296, an email option 1298, and an instant messaging address option 1299. Each of the options 1292, 1294, 1296, 1298, and 1299 include display information, a check box, as well as an edit option. The user can select/deselect a checkbox to determine the information inserted into the user's My Yellow Pages directory associated with this contact. Additionally, by selecting an edit option, the user can determine the displayed information for a particular field. As a nonlimiting example, if a user knows that Big Tony's Steaks has moved from their listed address, the user can change this data by selecting the edit option. Additionally, since no email address is listed for this particular advertiser, the user can enter an email address if one is known.

Also included in window 1290 is an Add to Folder . . . option 1293. The Add to Folder . . . option 1293 allows the user to determine one or more folders that the user desires this advertiser to be listed. More specifically, referring to FIG. 10, the user may be presented with the ability to select one or more of the categories under which to store Big Tony's Steaks. Additionally, the user may also be provided with the ability to create a new category under which to store this new contact. Window 1290 also includes an Add Other Data option 1295. The Add Other Data option 1295 can allow the user to add additional criteria for the contact. As a nonlimiting example, if the user has access to driving directions to Big Tony's Steaks, the user may select the Add Other Data option 1295 and create a new category for this data. The new criteria may be information that the user knows, or information that may be researched by the user. Upon adding new criteria and/or information, the new criteria can be listed in window 1290.

One should note that while window 1290 provides the user with an option to edit information related to a contact being added, as discussed above, the user's My Yellow Pages directory may also be configured to automatically update information related to contacts as that information changes. Additionally, while an edit option is provided in the exemplary embodiment of FIG. 12, one should also note that some embodiments can provide the user with the ability to amend information related to an advertiser in the user's My Yellow Pages directory (and/or remove the advertiser from the user's My Yellow Pages directory), as shown in FIG. 10.

Figure 13:
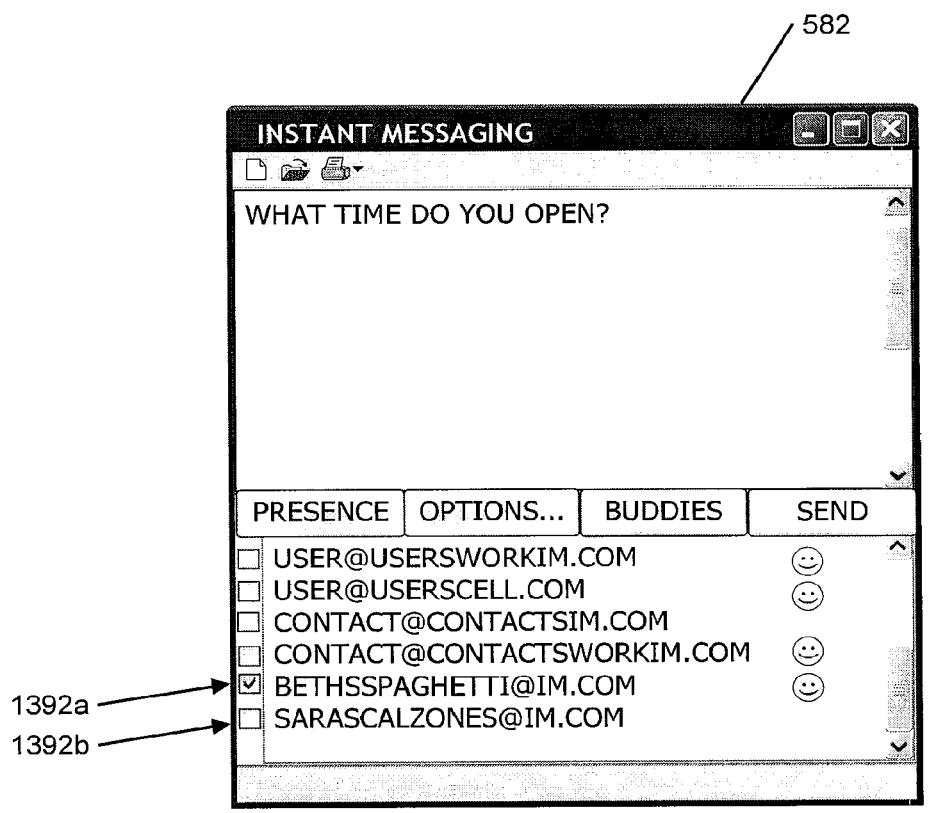
FIG. 13 is an exemplary display of an instant messaging interface, including contacts from the My Yellow Pages web page from FIG. 9.

FIG. 13 is an exemplary display of an instant messaging interface, including contacts from the My Yellow Pages web page from FIG. 9. In an exemplary embodiment, the instant messaging display 582, the user's contacts can include an instant messaging address associated with Beth's Spaghetti 1392a and an instant messaging address associated with Sara's Calzones 1392b. In at least one nonlimiting example, upon selecting contact option 1096a, from FIG. 10, the user can be provided with an option to add the selected business as one of the user's contacts. In such a scenario, the user can be provided with the business' presence data, without having to reciprocate presence data to the selected business.

Other embodiments can temporarily include the selected business (via option 1096) in the user's contact list. More specifically, upon selecting option 1096*a*, the user's instant messaging client can activate, with Beth's Spaghetti as a contact. The user can begin a communications thread with Beth's Spaghetti and upon termination of the instant messaging session with Beth's Spaghetti, the instant messaging client can remove Beth's Spaghetti as a contact.

Figure 14:
FIG. 14 is an exemplary display of a My Yellow Pages web page illustrating a passive advertising icon, similar to the My Yellow Pages web page from FIG. 9.

FIG. 14 is an exemplary display of a My Yellow Pages web page illustrating a passive advertising icon, similar to the My Yellow Pages web page from FIG. 9. In this exemplary embodiment, web browser interface 1490 includes a display of the user's My Yellow Pages display, under food tab 1492. As discussed above, Beth's Spaghetti and Sara's Calzones are displayed. Also included in this nonlimiting example is a passive advertisement icon 1494 related to Beth's Spaghetti Shop. As discussed above, the web host associated with the My Yellow Pages website can provide advertisers with the ability to include advertisements with their listings. In at least one nonlimiting example, Beth's Spaghetti Shop has arranged for a passive advertisement to become associated with their listing. A passive advertisement can take the form of an icon or other identifier that is displayed (or presented) to the user with the listing.

Figure 15:
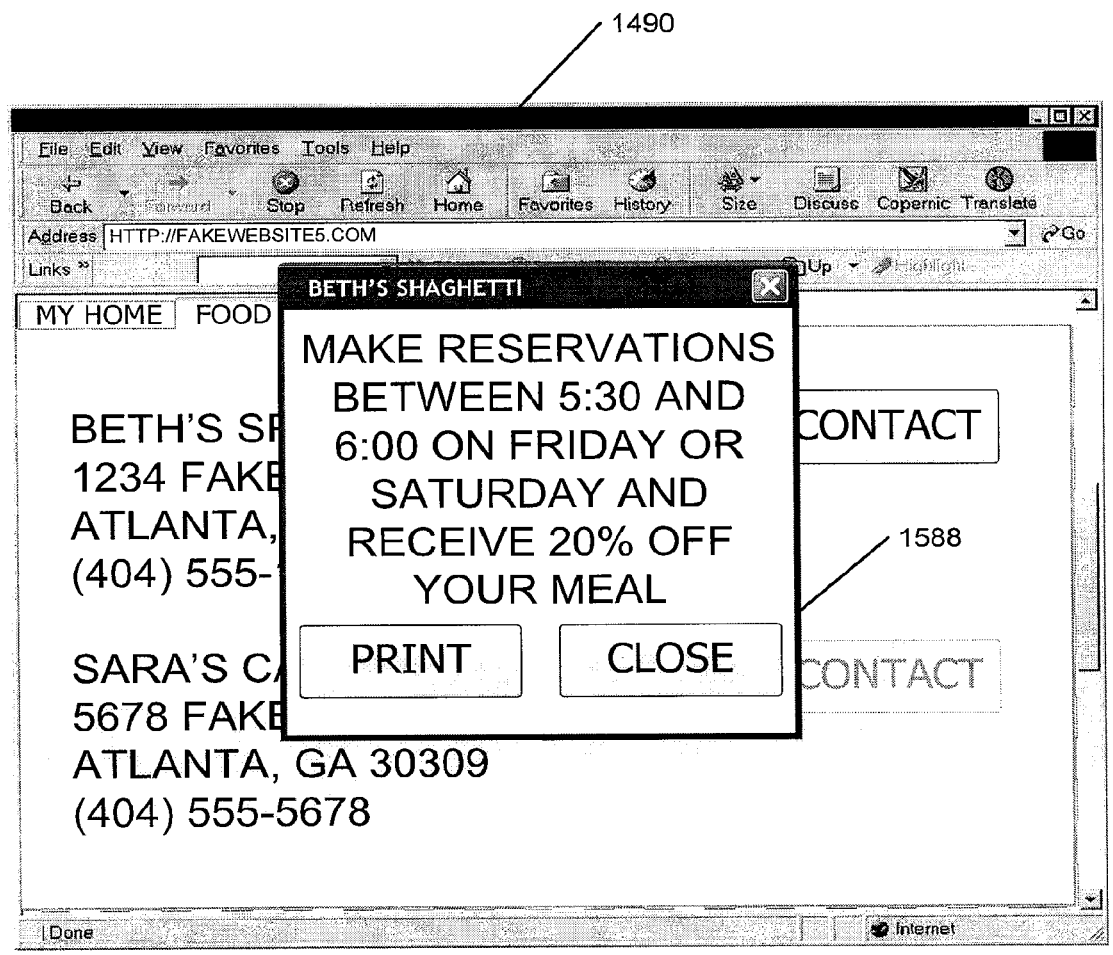
FIG. 15 is an exemplary display of a My Yellow Pages web page, further illustrating a passive advertising window that can be accessed via the passive advertising icon from FIG. 14.

FIG. 15 is an exemplary display of a My Yellow Pages web page, further illustrating a passive advertising window that can be accessed via the passive advertising icon from FIG. 14. In the exemplary embodiment of FIG. 15, upon selecting the passive advertisement icon 1494 (from FIG. 14), the user is presented with advertising window 1588. The user can also be provided with a plurality of options including a print option, a close option, and other options, such as a save option (not shown).

Figure 16:
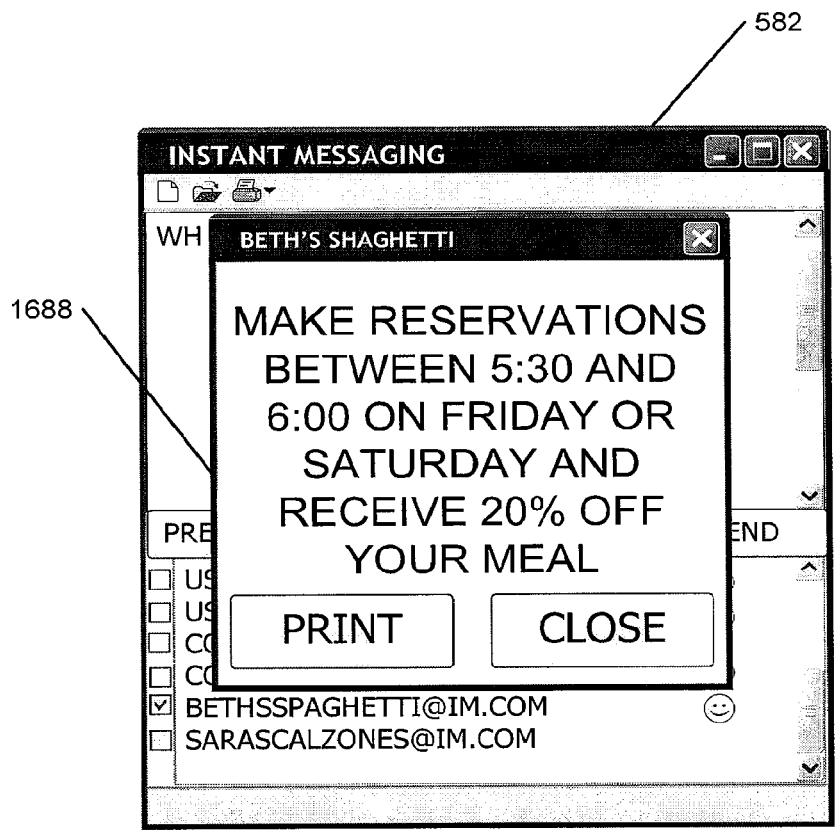
FIG. 16 is an exemplary display of an active advertisement received by a first user, similar to the passive advertisement from FIG. 15.

FIG. 16 is an exemplary display of an active advertisement received by a first user, similar to the passive advertisement from FIG. 15. In this exemplary embodiment, an advertiser (who is listed in the user's My Yellow Pages) has facilitated the propagation of an instant message to the user's instant messaging client. As compared with the passive advertisements illustrated in FIG. 15, which provides an option for the viewer to access advertisement data, the active advertisement of FIG. 16 is a targeted communication that is sent to a user. As illustrated, the active advertisement window 1688 can also include options such as print, close, save (not shown), etc.

Figure 17:
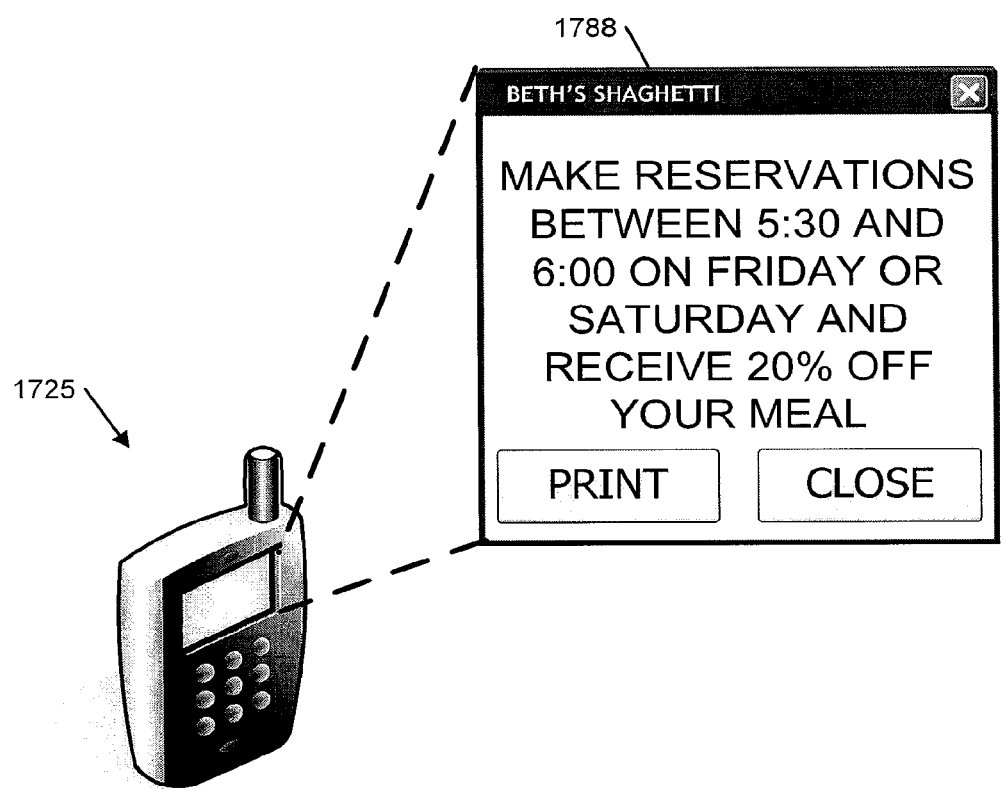
FIG. 17 is an exemplary display of an active advertisement received by a first user on a mobile device, similar to the display from FIG. 16.

FIG. 17 is an exemplary display of an active advertisement received by a first user on a mobile device, similar to the display from FIG. 16. More specifically, as discussed above, an advertiser that is listed in the user's My Yellow Pages directory can send active advertisements to the user. In at least one embodiment, the user can have a cell phone, PDA, and/or other mobile device 1725 that may be configured to receive these active advertisements. In such a scenario, the user may be provided with advertisements such as window 1788 from an advertiser. The advertisement may include a graphical display, audio, and/or other signifier. Additionally, in at least one embodiment, the mobile device 1725 may simply provide a notification display that a new advertisement has arrived. The user may then access the advertisement via the mobile device 1725 and/or another device.

Figure 18:
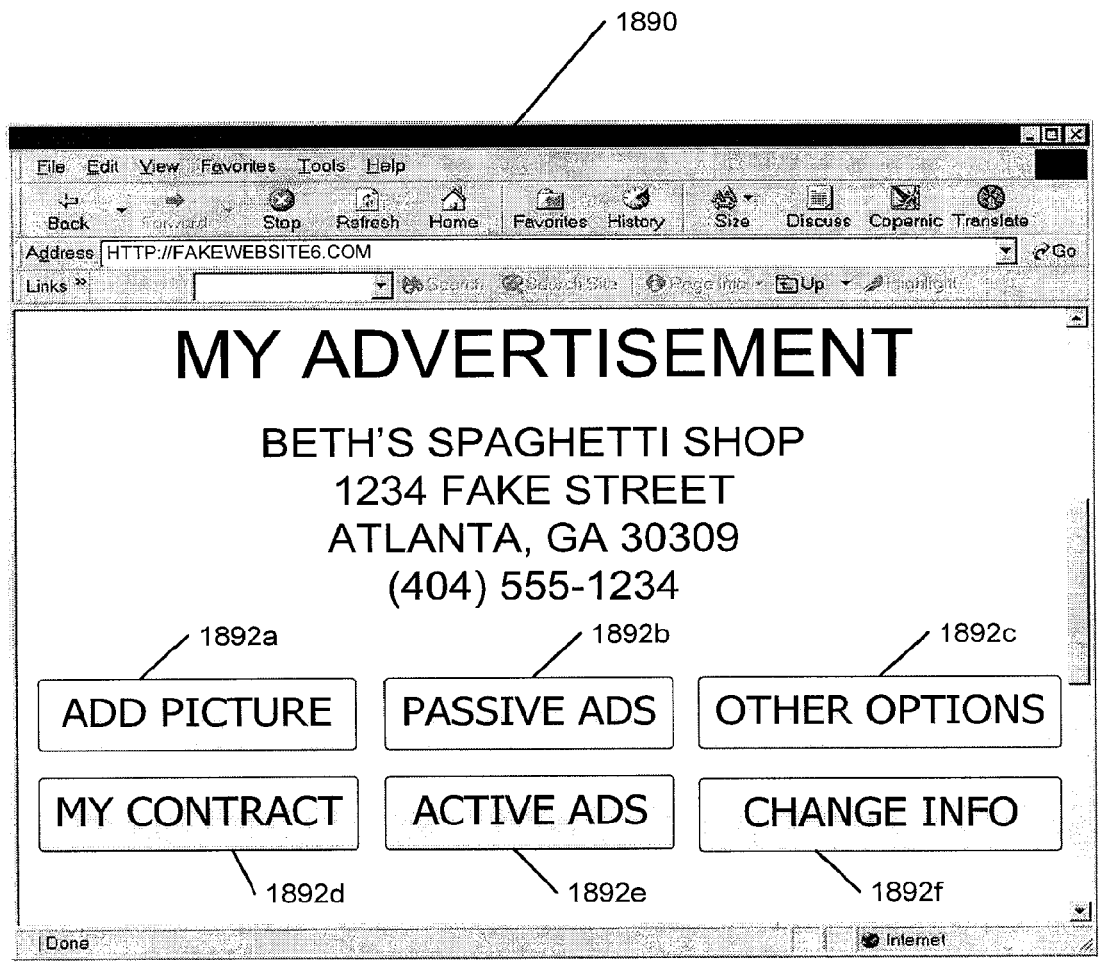
FIG. 18 is an exemplary display of an administrative web page, which can be accessed via the administrators option from FIG. 8.

FIG. 18 is an exemplary display of an administrative web page, which can be accessed via the administrators option from FIG. 8. As illustrated in this exemplary embodiment, the administrative page includes an add picture option 1892*a*, a passive ads option 1892*b*, an other options option 1892*c*, a my contract option 1892*d*, an active ads option 1892*e*, and a change info option 1892*f*. The add picture option 1892*a* allows the advertiser to add various data to the advertiser's listing. More specifically, by selecting the add picture option 1892*a*, the advertiser can be provided with the ability to add pictures, logos, audio, video, and other enhancements to the advertiser's listing. While each add-on option can be associated with a price, this is not a requirement. Depending on the particular agreement the advertiser has reached with the web host, these options can be priced any of a plurality of ways.

Also included in nonlimiting example of FIG. 18 is a my contract option 1892*d*. The my contract option 1892*d* can allow the advertiser to view and potentially amend the current contract the advertiser has with the web host. More specifically, in an exemplary embodiment, the advertiser can view the contract duration and options (as well as other data) associated with the advertiser's current contract. The advertiser can also be provided the ability to extend the current contract, as well as view other plans, options, and pricing.

The passive ads option 1892*b* provides the ability for the advertiser to create a passive advertisement for association with the advertiser's listing. As described in more detail below, the user can be provided with the ability to determine the layout and data in the passive advertisement, as well as determine the duration of the advertisement. Similarly, the active ads option 1892*e* provides the advertiser with the ability to create and manage an active advertisement that can be sent to users with the advertiser's listing in their My Yellow Pages directory. As discussed in more detail below, the active ads option 1892*e* can include the ability to determine text, video, audio, as well as other options that can be included with the active advertisement.

The other options option 1892*c* can provide the advertiser with ability to determine various miscellaneous options related to the advertiser's listing. More specifically, the advertiser can be provided with the ability to change display options, color options, font options, and other options that are not provided elsewhere. Similarly, the change info option 1892*f* can provide the advertiser with the ability to change information in the advertiser's listing. More specifically, the advertiser can select this option to change the address of the listing, the name, phone number, email address, instant messaging address, etc.

Figure 19:
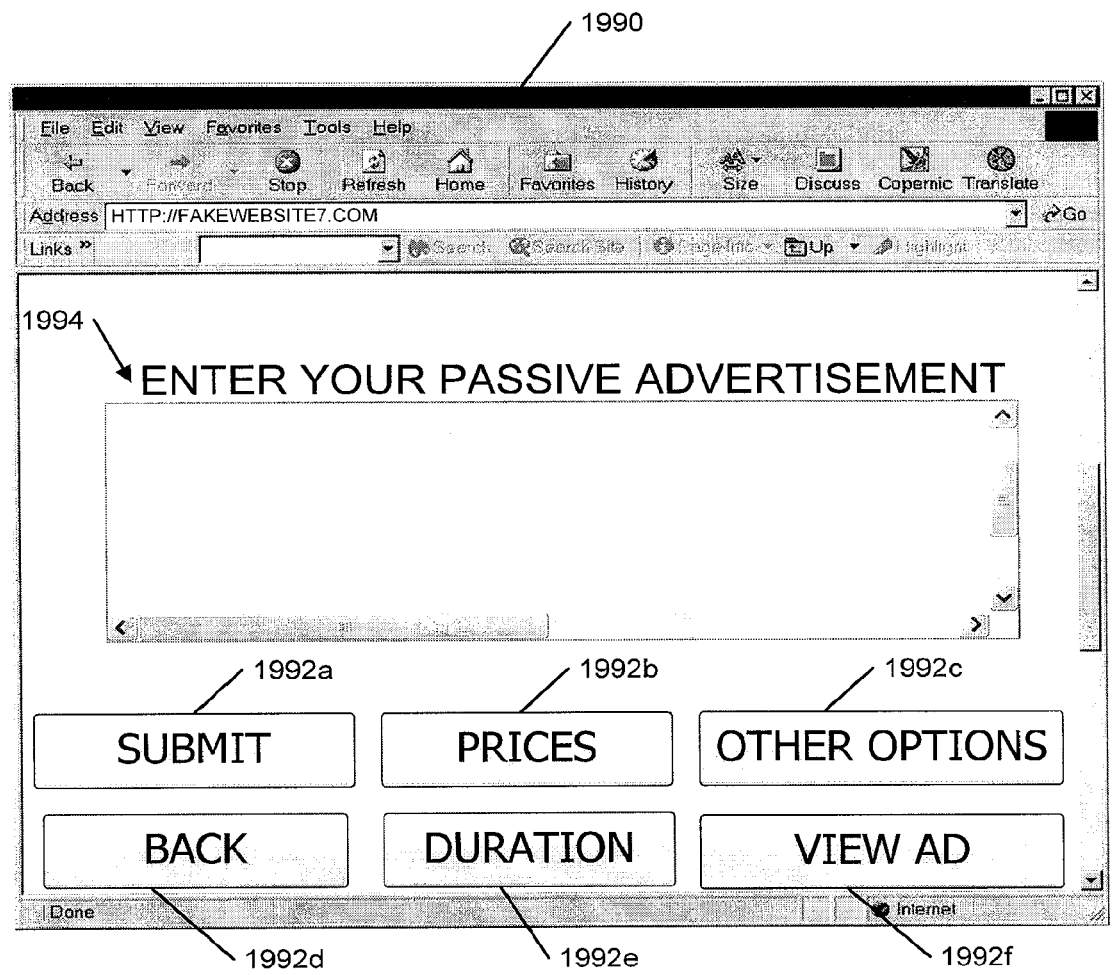
FIG. 19 is an exemplary display illustrating an advertiser's ability to create a passive advertisement, such as the advertisement from FIG. 15.

FIG. 19 is an exemplary display illustrating an advertiser's ability to create a passive advertisement, such as the advertisement from FIG. 15. As illustrated, web browser interface 1990 includes a passive advertisement text prompt 1994 to provide an advertiser with the ability to determine the text that will be included with the passive advertisement. The submit option 1992*a* can submit the created advertisement to the web host, as well as facilitate communication of billing information related to the created advertisement to the billing network 308. The back option 1992*d* can take the advertiser back to the previous page. The prices option 1992*b* can provide the advertiser with various price plans associated with a passive advertisement. The duration option 1992*e* can provide the advertiser with the ability to view and select a desired duration for running the passive advertisement. The other options option 1992*c* can provide the advertiser with the ability to change other options associated with the selected advertisement. Such options could include font, color, shading, pictures, video, audio, size, etc. The view ad option 1992*f* can provide the advertiser with the ability to view the created advertisement prior to purchasing the advertisement.

Figure 20:
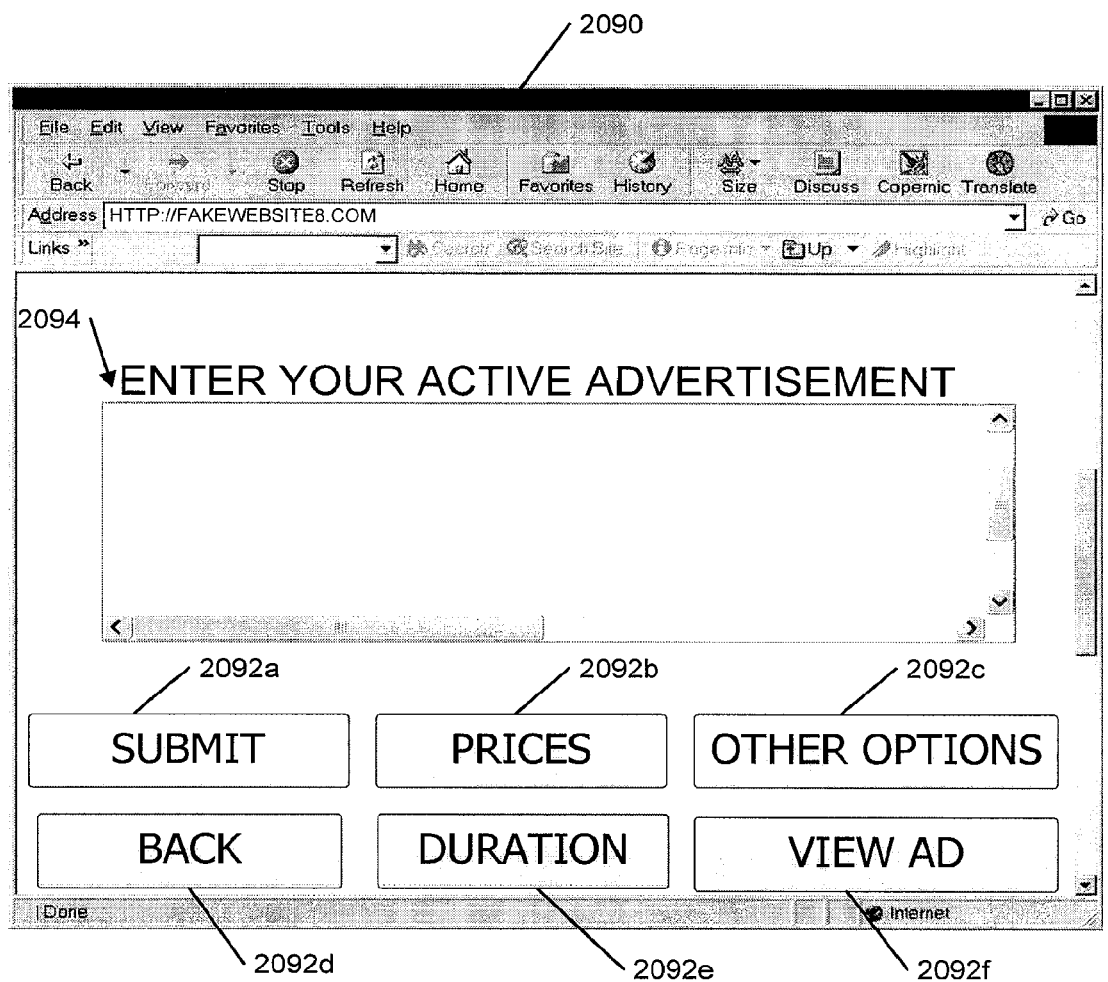
FIG. 20 is an exemplary display illustrating an advertiser's ability to create an active advertisement, such as the advertisement from FIG. 16.

FIG. 20 is an exemplary display illustrating an advertiser's ability to create an active advertisement, such as the advertisement from FIG. 16. As illustrated, web browser interface 2090 includes an active advertisement text prompt 2094 to provide an advertiser with the ability to determine the text that will be included with the active advertisement. The submit option 2092a can submit the created advertisement to the web host, as well as facilitate billing information related to the created advertisement to the billing network 308. The back option 2092d can take the advertiser back to the previous page. The prices option 2092b can provide the advertiser with various price plans associated with a passive advertisement, as well as pricing related to various options. The duration option 2092e can provide the advertiser with the ability to view and select a desired duration for running the passive advertisement, as well as a frequency of delivery. More specifically, while many advertisers may desire to send a single advertisement to users based on a present status of the advertiser's business (i.e., 20% off if a purchase is made in the next two hours), other advertisers may prefer to send regular advertisements to users.

The other options option 2092c can provide the advertiser with the ability to change other options associated with the selected advertisement. Such options could include font, color, shading, pictures, video, audio, size, etc. Depending on the particular advertisement being created, the selection of options may vary. The view ad option 2092f can provide the advertiser with the ability to view the created advertisement prior to purchasing the advertisement.

One should note that other options can also be provided to the advertiser in relation to a desired active advertisement. In at least one exemplary embodiment, the advertiser can be provided with an option to provide the advertisement to users within predefined geographical location. More specifically, if a particular branch of the advertiser is having a sale for a short amount of time, the advertiser may desire that the active advertisement only be provided to users within a certain geographical area (such as a 2 mile radius). Similarly, depending on the configuration, this geographic filter can be provided based on actual location of the user at that time (present geographical location) or geographical location of the registered account (billing address). Similarly, variations of duration of the advertisements can be made based on geographic location.

Figure 21:
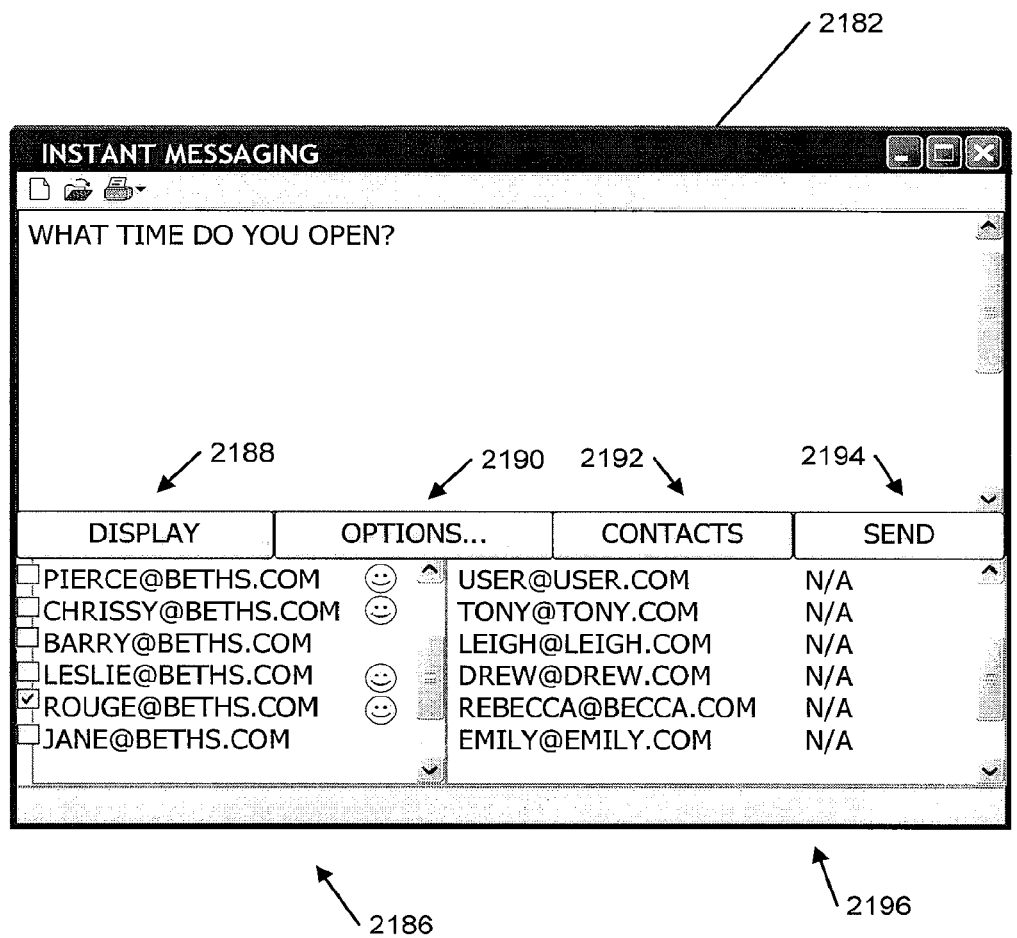
FIG. 21 is an exemplary display of an advertiser's instant messaging user interface, illustrating the limited presence functionality, similar to the user's instant messaging display from FIG. 5.

FIG. 21 is an exemplary display of an advertiser's instant messaging user interface, illustrating the limited presence functionality, similar to the user's instant messaging display from FIG. 5. As discussed above, in an exemplary embodiment, the advertiser's client device 106j can include an instant messaging client (which can be associated with client communications software 499) with certain presence restrictions. More specifically, in at least one nonlimiting example, the advertiser's instant messaging client can communicate with users who initiate a communications session via the My Yellow Pages web site. In such a scenario, the advertiser's presence can be available to the user via the My Yellow Pages website or via the user's instant messaging client (or both). However, the users' presence may be unavailable to the advertiser.

In the exemplary embodiment of FIG. 21, an advertiser's instant messaging interface 2182 includes a text prompt, as well as display option 2188, options option 2190, contacts option 2192, and send option 2194. Also included is a contacts section 2186 that can include a list of contacts of the business. As illustrated, at least one nonlimiting example can provide that the contacts in contacts section 2186 include employees of the business, as well as their current presence status. Other embodiments can also include contacts (and their presence status) of other entities outside of the corporate structure of the business.

Also included in the exemplary embodiment of FIG. 21 is a customer contacts section 2196, which can include a list of those users who include the advertiser in the users' My Yellow Pages. As illustrated, presence information related to these users is not available. As one of ordinary skill in the art will understand, by providing a list of users who include the advertiser in the users' My Yellow Pages, the advertiser can monitor the popularity of this advertisement, as well as a cost benefit analysis of the expenditure.

In addition to the current customers list displayed in customer contacts section 2196, the advertiser can also be provided with various reports related to their Yellow Page listing. In an exemplary embodiment, an advertiser can be provided with data related to users who have included the advertiser's listing in their "My Yellow Pages," as well as reports related to duration that users keep the advertisers listing, the users' location, etc. This data can be provided through the instant messaging client, however this is not a requirement. Other nonlimiting examples can include access to the reports via the administrative portion of the Yellow Pages web site, as well as via email, postal mail, and other forms of data communication.

Figure 22:
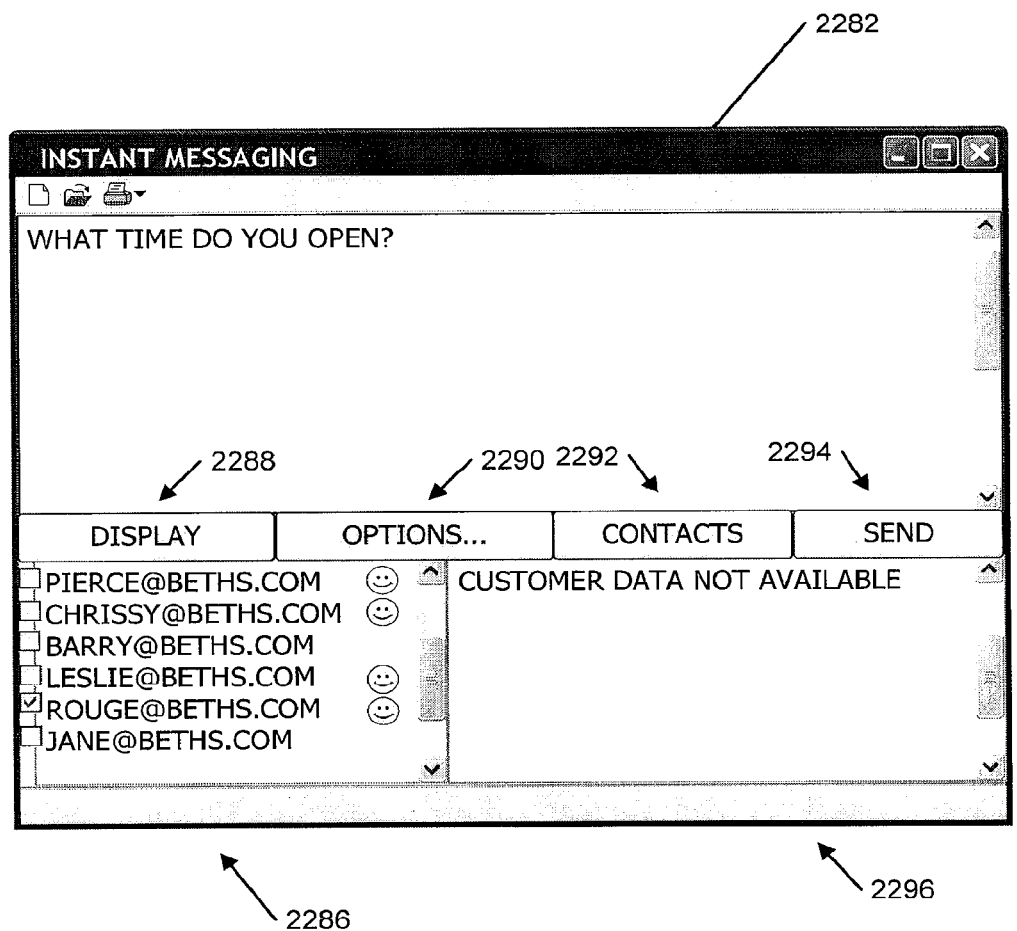
FIG. 22 is an additional exemplary display of an advertiser's instant messaging user interface, illustrating limited presence and contact functionality, similar to the display from FIG. 21.

FIG. 22 is another exemplary display of an advertiser's instant messaging user interface, illustrating limited presence and contact functionality, similar to the display from FIG. 21. As discussed above, in an exemplary embodiment, the advertiser's client device 106j can include an instant messaging client (which can be associated with client communications software 499) with certain presence restrictions. More specifically, in at least one nonlimiting example, the advertiser's instant messaging client can communicate with users who initiate a communications session via the My Yellow Pages web site. In such a scenario, the advertiser's presence can be available to the user via the My Yellow Pages website or via the user's instant messaging client (or both). However, the users' presence may be unavailable to the advertiser.

In the exemplary embodiment of FIG. 22, an advertiser's instant messaging interface 2282 includes a text prompt, as well as display option 2288, options option 2290, contacts option 2292, and send option 2294. Also included is a contacts section 2286 that can include a list of contacts of the business. As illustrated, at least one nonlimiting example can provide that the contacts in contacts section 2286 include employees of the business, as well as their current presence status. Other embodiments can also include contacts (and their presence status) of other entities outside the business's instant messaging infrastructure.

Also included in the exemplary embodiment of FIG. 22 is a customer contacts section 2296, which does not provide any information regarding the advertiser's customers. Such a configuration may be desirable to those users who wish to keep their information private. More specifically, in at least one nonlimiting example, the users can be provided with an option (on the users' instant messaging client, on the My Yellow Pages web site, or both) to determine the information that is communicated to the advertisers. Similarly, the users can also select whether an advertiser can contact the user with an active advertisement.

Figure 23:
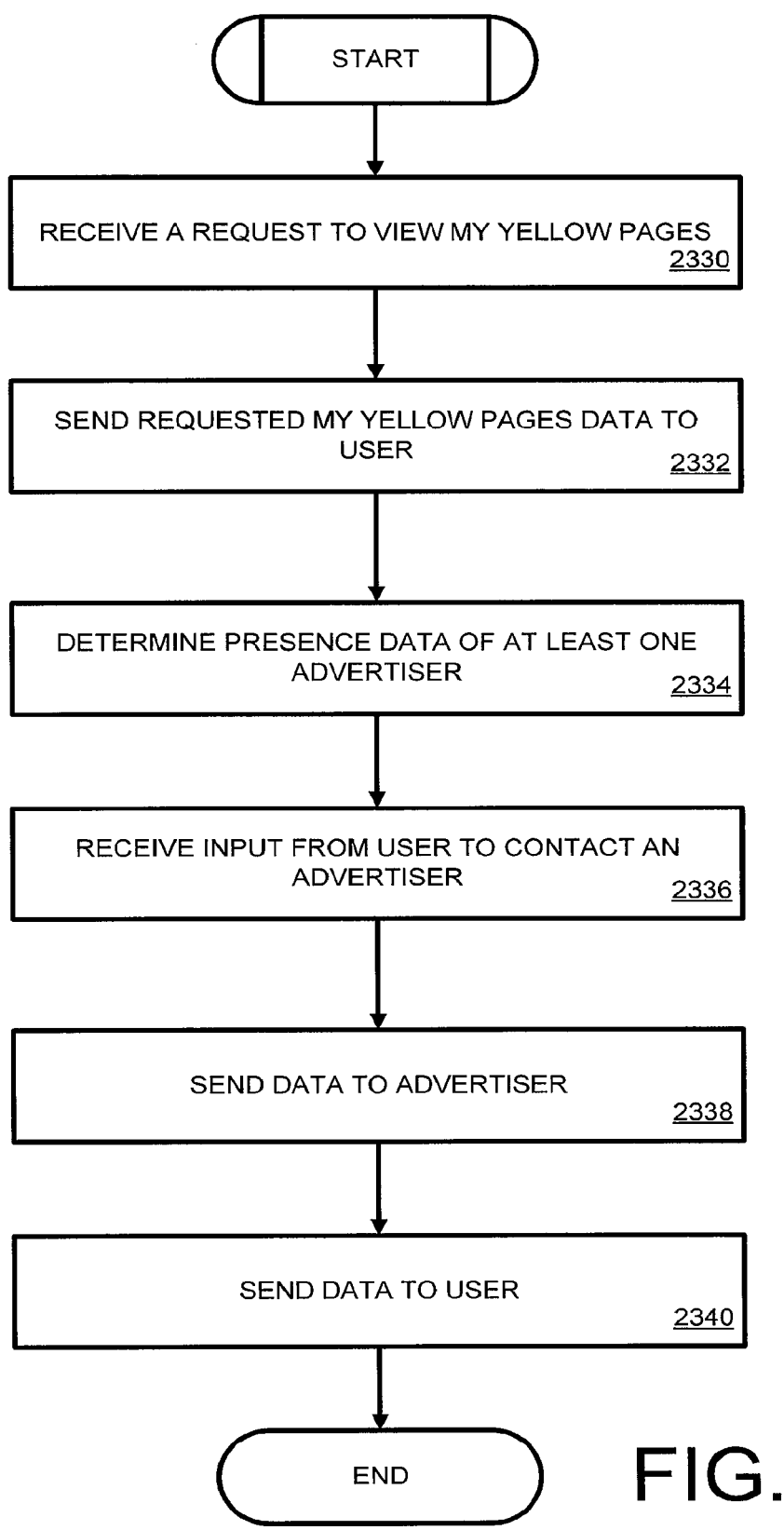
FIG. 23 is a flowchart illustrating exemplary steps that can be taken by a server to facilitate communication between a user and an advertiser in relation to the My Yellow Pages display from FIG. 9.

FIG. 23 is a flowchart illustrating exemplary steps that can be taken by a server to facilitate communication between a user and a data provider, such as an advertiser, in relation to the My Yellow Pages display from FIG. 9. As illustrated in this exemplary embodiment, the first step is for a web host (such as web host 310) to receive a request to view My Yellow Pages (block 2330). Upon receiving the request, the web host can send the requested My Yellow Pages data to the user's client device 106 (block 2332). The web host can then determine presence data related to at least one advertiser or data provider (block 2334). As indicated below, while in this nonlimiting example the presence data is determined after the user accesses the My Yellow Pages web site, this is a nonlimiting example. In at least one embodiment, presence data related to the advertisers can be constantly or periodically monitored.

After the user accesses the My Yellow Pages data (which can include presence data associated with at least one advertiser), the web host can receive input from the user indicating a desire to contact at least one of the advertisers in the user's My Yellow Pages (block 2336). Upon receiving the request, the web host can send data to the advertiser or data provider related to this request (block 2338), as well as send data to the user's client device 106 related to the request (block 2340).

In at least one exemplary embodiment, code associated with the My Yellow Pages web site (which can include HTML, JavaScript, etc.) can be configured to instruct the user's client device 106 to activate the user's instant messaging client upon selection of the "contact" option (see FIG. 10, 1096). Data may also be sent from the web host to the advertiser's instant messaging client, indicating that the user is initiating an instant messaging session. Other embodiments may simply activate the user's instant messaging client with the desired data to automatically initiate an instant messaging session with the desired advertiser.

Figure 24:
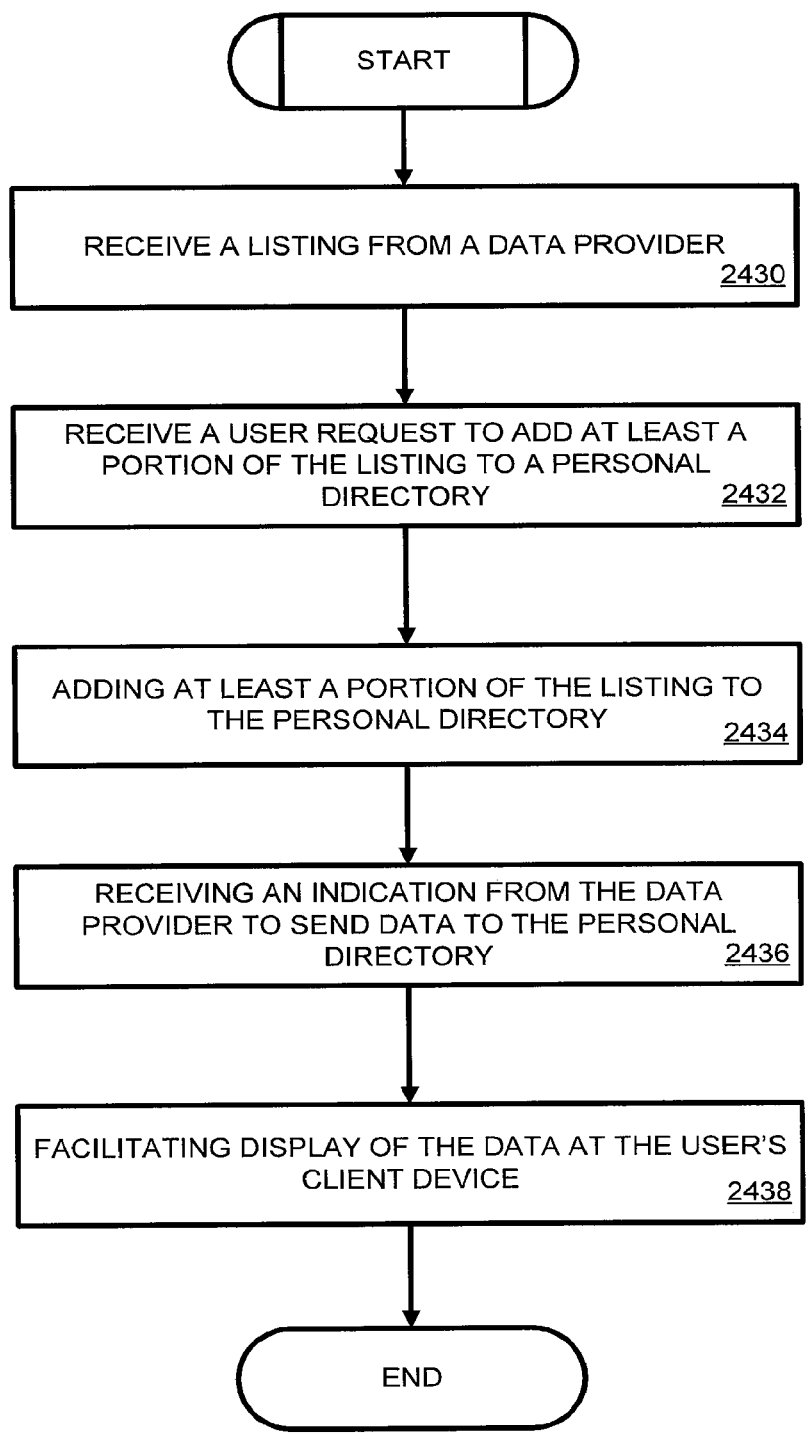
FIG. 24 is a flowchart illustrating exemplary steps that can be taken by a server to send data, such as an advertisement, to a user's device, similar to the flowchart from FIG. 23.

FIG. 24 is a flowchart illustrating exemplary steps that can be taken by a server 102 to send data, such as an advertisement, to a user's device, similar to the flowchart from FIG. 23. The first step in this nonlimiting example is for a server 102 to receive a listing from a data provider, such as an advertiser (block 2430). Upon receiving a listing, the server 102 can receive a user request to add at least a portion of the listing to a personal directory, such as a My Yellow Pages directory (block 2432). The server 102 can then add at least a portion of the listing to the personal directory (block 2434). The server 102 can then receive an indication from the data provider to send data to the personal directory (block 2436). The server 102 can then facilitate display of the data at the user's client device (block 2438).

Figure 25:
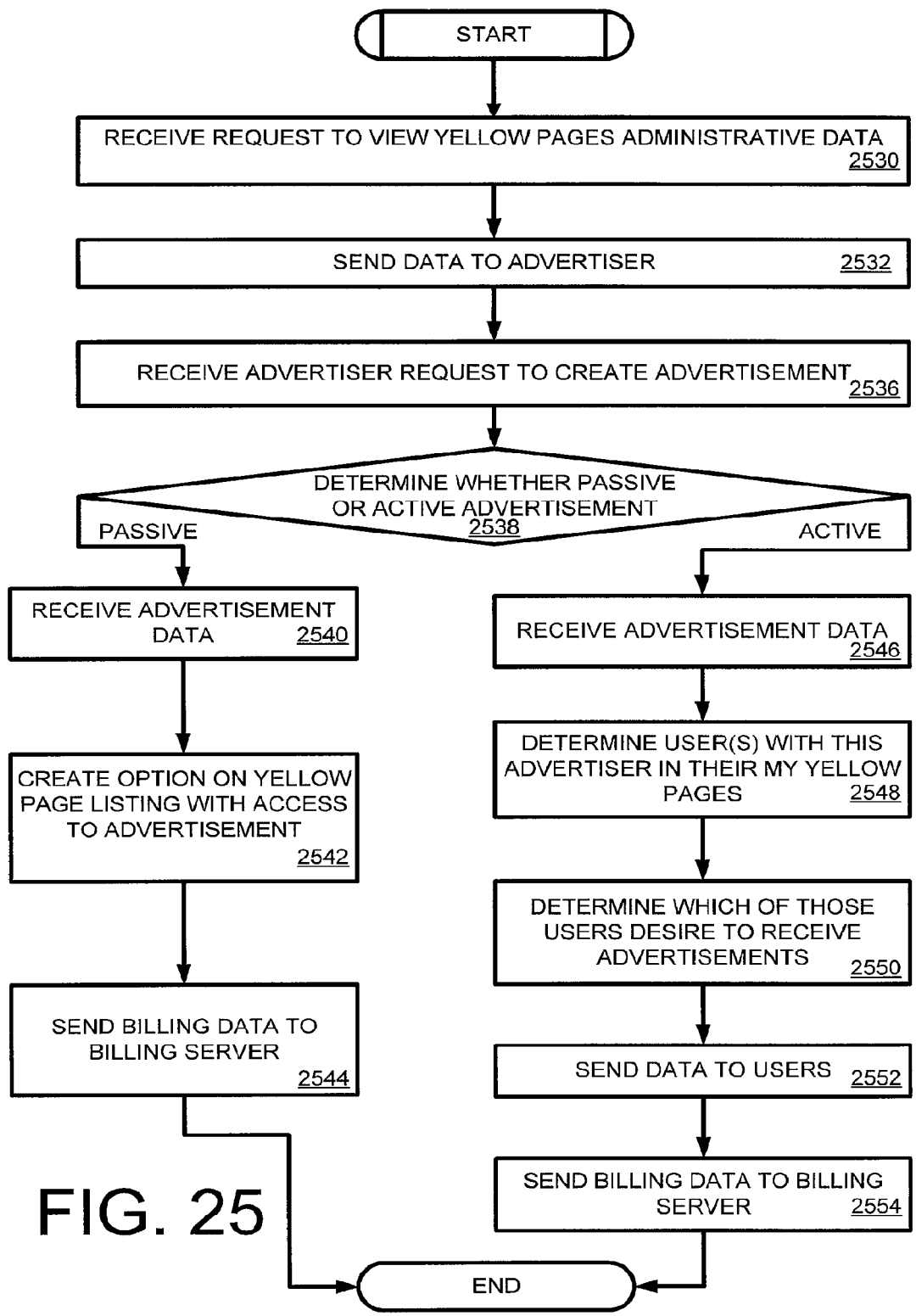
FIG. 25 is a flowchart illustrating exemplary steps that can be taken by a server in creating data, such as the advertisements of FIGS. 15 and 16.

FIG. 25 is a flowchart illustrating exemplary steps that can be taken by a server in creating data, such as the advertisements of FIGS. 15 and 16. According to this exemplary embodiment, the web host can first receive a request from an advertiser to view the Yellow Pages administrative data (block 2530). Upon receiving the request, the web host can send the requested data to the advertiser (block 2532). The web host can then receive an advertiser request to create an advertisement (block 2536) and determine whether the requested advertisement is passive or active (block 2538).

If the web host determines that requested advertisement is passive, the web host can receive the advertisement data (block 2540). More specifically, in at least one nonlimiting example, the web host can receive text, graphics, audio, video, etc. to create the advertisement. Additionally, the web host can receive various other data including duration, fonts, size, as well as other options related to the requested advertisement. Next, the web host can create an option on the advertiser's Yellow Page listing that provides user access to the created advertisement (block 2542). As discussed above, upon selecting the option (which can take the form of a button, icon, or other indicator), the user can be presented with the created advertisement, as well as options to print, save, etc. While not discussed above, the web host can also receive data associated to the type and appearance of the option (icon, button, emoticon, etc.) from the advertiser. Once the advertisement is created, the web host can send billing data related to the created advertisement to a billing server, such as billing server 308 (block 2544).

If, on the other hand, the web host determines that the desired advertisement is active (decision block 2538), the web host can receive the advertisement data from the advertiser (block 2546). Similar to above, the advertisement data can include any of a plurality of data associated with the desired advertisement, such as text, video, audio, method of dissemination (email, instant messaging, VoIP, etc.), as well as options such as whether to deliver messages based on presence of the user on an account, presence of a user on a device, etc. More specifically, in at least one embodiment, the web host can determine presence of a user on an account (such as an instant messaging account), and if that user is present when the advertisement is set to disseminate, the advertisement will be sent to that account. If the user is not present, the web host can look for another account associated with that user, queue the advertisement for later delivery, or simply refrain from sending the advertisement to the user. Similarly, device presence can be provided as an option. More specifically, in at least one exemplary embodiment, the web host can determine if a user is present on his or her home computer. If so, the web host can send the advertisement to the home computer. If the user is not present on the home computer, the web host can determine whether the user is present on the user's mobile telephone, and if so, send the advertisement to the mobile telephone. Other device specific presence options can similarly be provided, such as sending the advertisement to all devices, specific devices, or any option in between.

Once the web host has received advertisement data, the web host can determine which users list this advertiser in their My Yellow Pages (block 2546 and 2548). The web host can then determine which of those users desire to receive such advertisements (block 2550). As discussed above, the users can be presented with an option as to whether the user desires to receive active advertisements from this and other advertisers, and under what circumstances. Once the web host has made these determinations, the web host can send the advertisements to those users (block 2552). The web host can then send billing data related to that advertisement to a billing server (such as billing server 308), as illustrated in block 2554.

Figure 26:
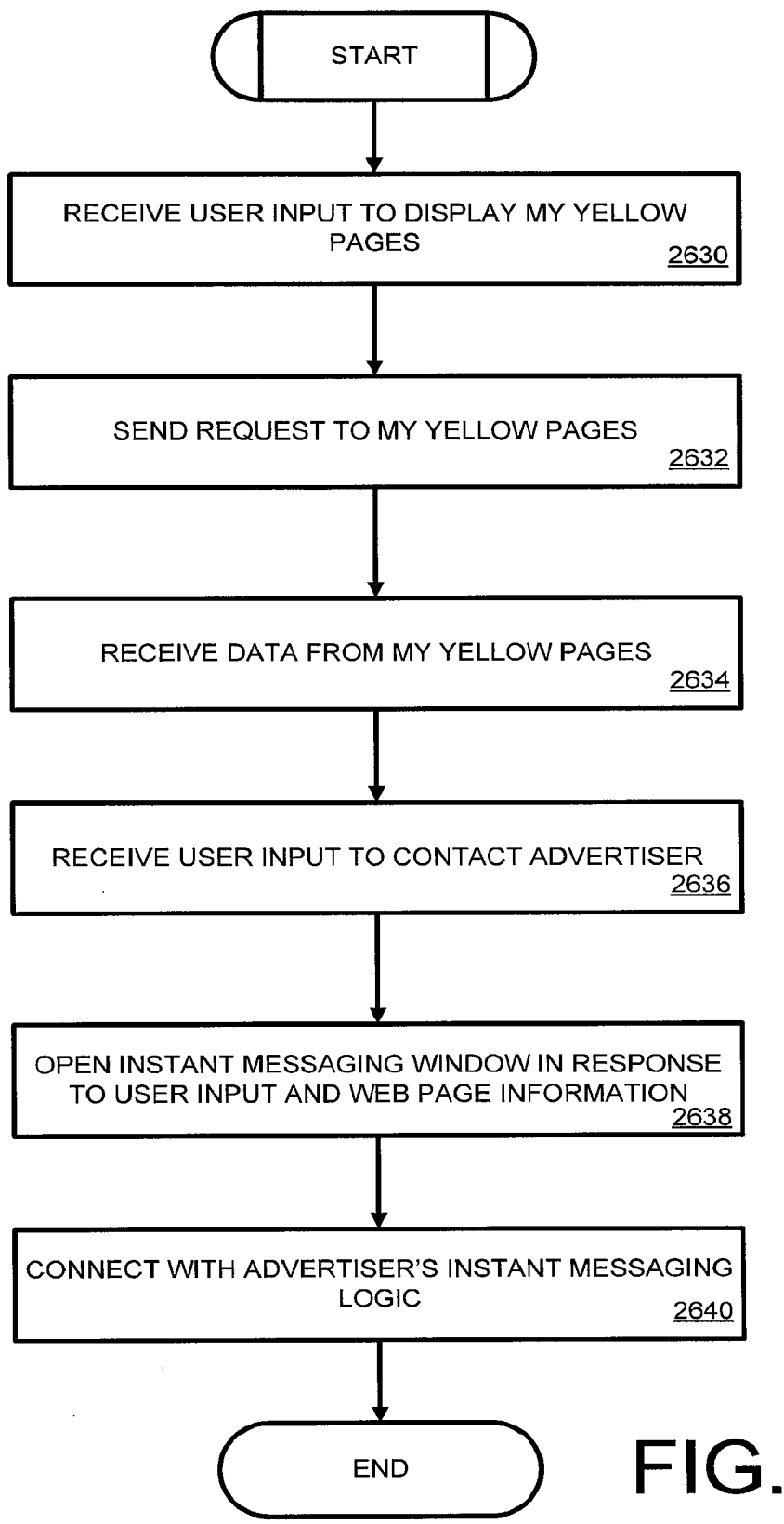
FIG. 26 is a flowchart illustrating exemplary steps that can be taken by a client device in communicating with a data provider, such as an advertiser associated with the user's My Yellow Pages, such as displayed in FIG. 9.

FIG. 26 is a flowchart illustrating exemplary steps that can be taken by a client device in communicating with a data provider, such as an advertiser associated with the user's My Yellow Pages, such as displayed in FIG. 9. According to this exemplary embodiment, the first step in this exemplary flowchart is for the user's client device 106 to receive user input to display My Yellow Pages (block 2630). The user's client device 106 can then send a request to My Yellow Pages for displaying the requested data (block 2632). Next, the user's client device 106 can receive the requested data from My Yellow Pages (block 2634). The user's client device 106 can then receive user input to contact an advertiser listed in the My Yellow Pages directory (block 2636). The user's client device 106 can then facilitate activation of an instant messaging client in response to the user input and web page information (block 2638). The user's client device 106 can then connect with the advertiser's instant messaging client (block 2640).

Figure 27:
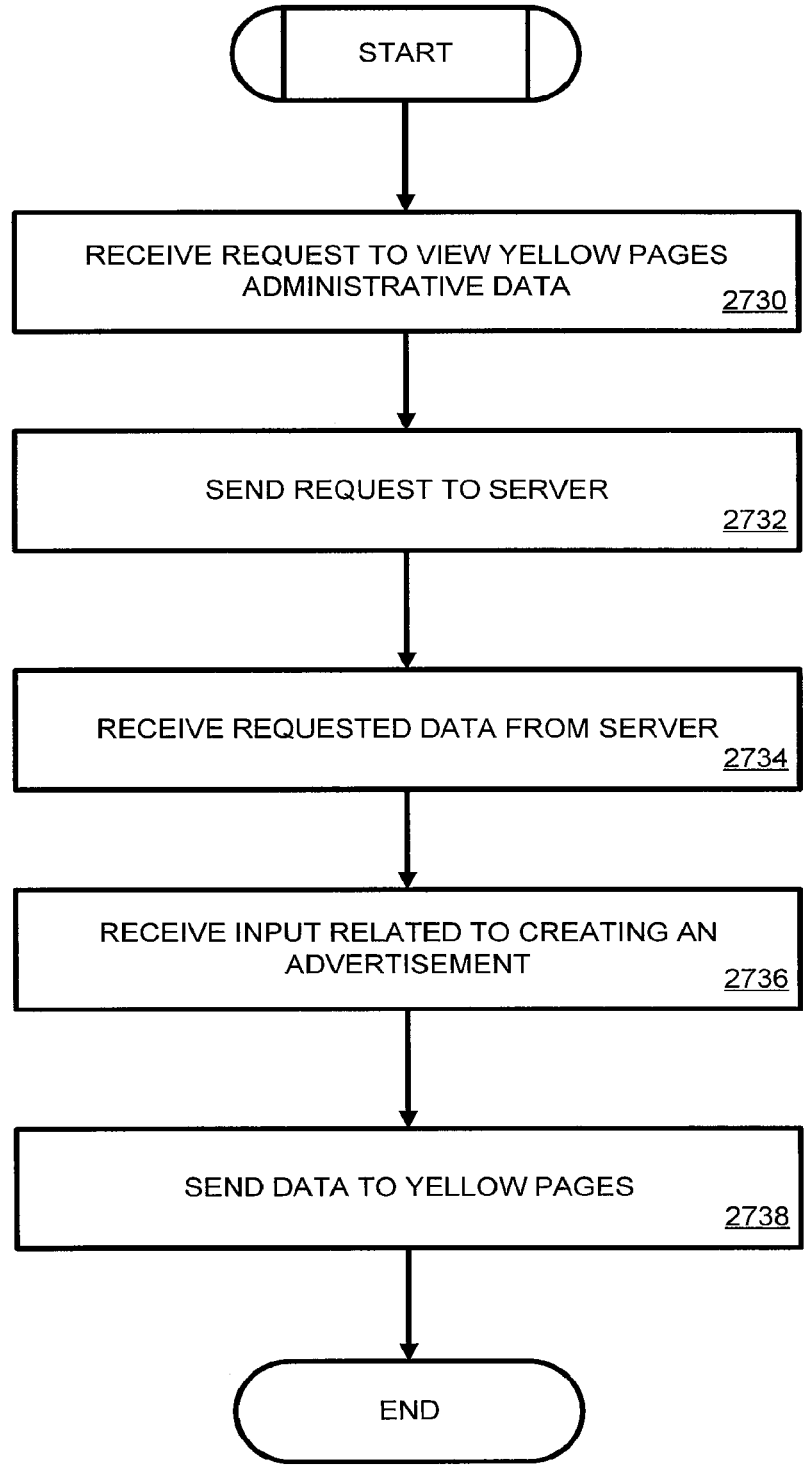
FIG. 27 is a flowchart illustrating exemplary steps that can be taken by a client device to create data, such as the advertisements from FIGS. 15 and 16.

FIG. 27 is a flowchart illustrating exemplary steps that can be taken by a client device to create data, such as the advertisements from FIGS. 15 and 16. More specifically, in the nonlimiting example of FIG. 27, the first step is for the advertiser's client device 106 to receive a request from the advertiser to view the Yellow Pages administrative data (block 2730). The advertiser's client device 106 can then send a request to the web host for the administrative data (block 2732). Next, the advertiser's client device 106 can receive the requested data from the web host (block 2734). Upon receiving the requested data from the web host 310, the advertiser's client device can receive input related to creating an advertisement (block 2736). The input can be related to whether the advertisement is a passive advertisement or an active advertisement, as well as duration the advertisement is to be displayed. Other data that can be sent from the advertiser's client device 106 to the web host includes data associated to method of delivery, presentation of the advertisement, as well as other data. The advertiser's client device can then send advertisement data to the web host 310 (block 2738).

Figure 28:
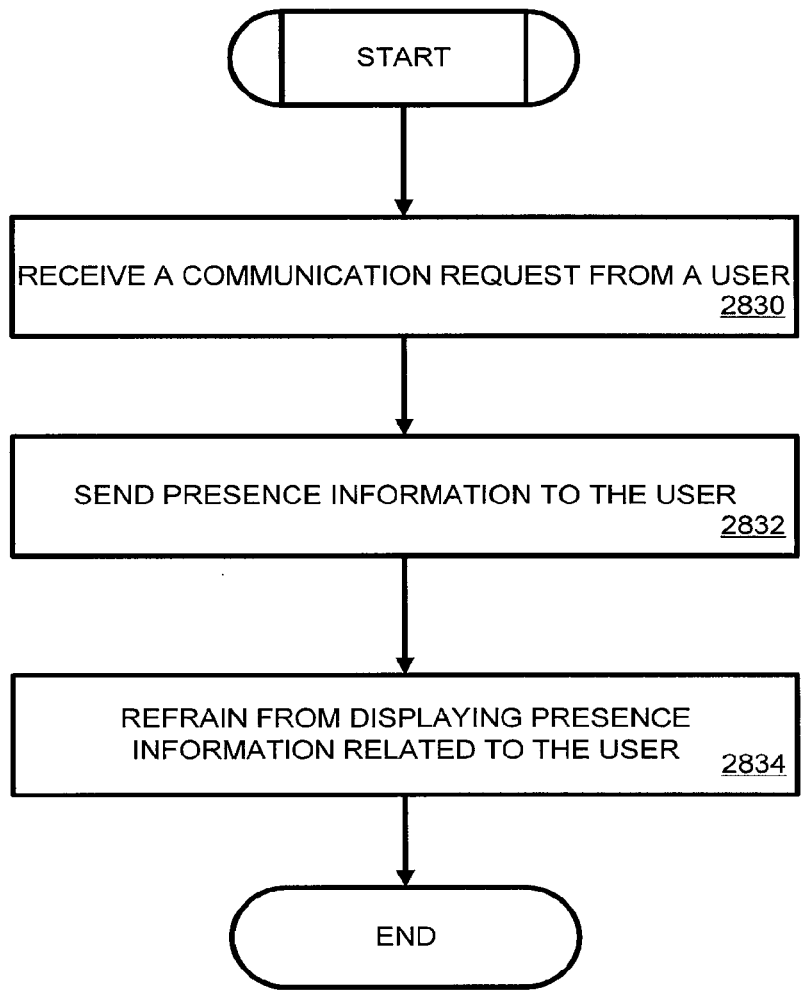
FIG. 28 is a flowchart illustrating exemplary steps that can be taken by a data provider's client device, similar to the steps from FIG. 27.

FIG. 28 is a flowchart illustrating exemplary steps that can be taken by a data provider's client device, similar to the steps from FIG. 27. As illustrated in this exemplary embodiment, the first step is to receive a communications request from a user (block 2830). As discussed above, a user can access the My Yellow Pages web site, and can access the contact option 1096 (FIG. 10). Access of the contact option 1096 can facilitate activation of the user's instant messaging client, which can send a communications request to the advertiser's instant messaging client. Upon receiving the communications request, the advertiser's instant messaging client can send presence information to the user's instant messaging client (block 2832). As discussed above, the advertiser's presence information can be sent to the user via the My Yellow Pages web site, or via the instant messaging client. Additionally, the advertiser's presence data can be sent to the user before, after, or during (or any permutation) initiation of the instant messaging session.

The next step is to prevent display of the user's presence data (block 2834). Prevention of the user's presence data can occur in any of a plurality of different ways. In at least one nonlimiting example, the advertiser's instant messaging client can be configured to simply refrain from displaying presence data when a communications request occurs as a result of selecting the contact option 1096. Other embodiments can provide that the instant messaging server (such as communications network 302) receive data indicating that any communication request to the advertiser that results from user selection of the contact option 1096 not include presence information related to the user. In such a scenario, the advertiser's instant messaging client would not receive the user's presence data. Other configurations can provide that the presence data is never sent.

Figure 29:
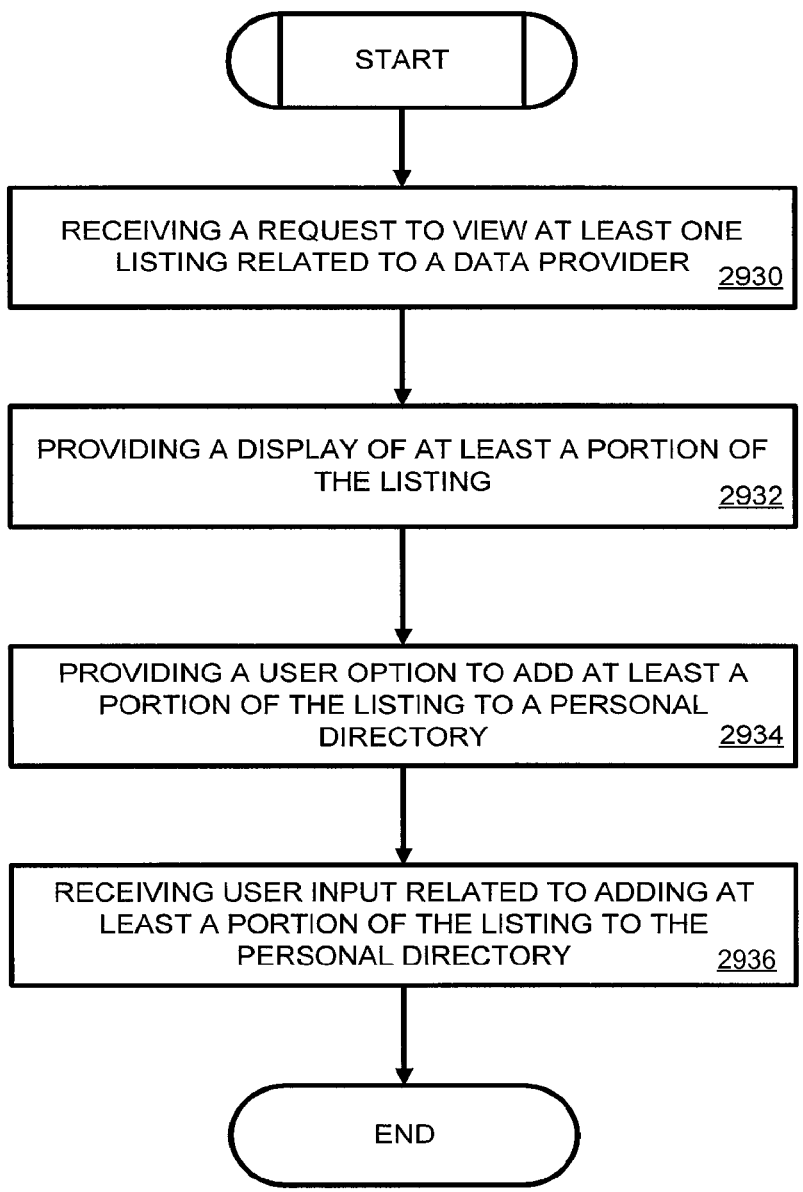
FIG. 29 is a flowchart illustrating exemplary steps that can be taken by a server in providing an Add to Contacts option for a personal directory, similar to the flowchart from FIG. 28.

FIG. 29 is a flowchart illustrating exemplary steps that can be taken by a server in providing an Add to Contacts option for a personal directory, similar to the flowchart from FIG. 28. More specifically, the first step in the nonlimiting example of FIG. 29 is for a server 102 to receive a user request to view at least one listing related to a data provider, such as an advertiser (block 2930). The server 102 can then provide a display of at least a portion of the listing (block 2932). The server 102 can then provide a user option to add at least a portion of the listing to a personal directory, such as the My Yellow Pages directory (block 2934). The server 102 can then receive user input related to adding at least a portion of the listing to the personal directory (block 2936).

At this point, the server can facilitate an association of the listing to the user's personal directory. The association can include a pointer (and/or other indicator) at the user's directory to display information related to this data provider, however this is not a requirement. Additionally, other options can be provided, such as the ability to edit and delete a listing, as described above.

One should note that while one or more of the embodiments discussed above includes instant messaging, these are nonlimiting examples. More specifically, in at least one embodiment, Multimedia Messaging Systems (MMS) and/or multimedia services may also be utilized to perform one or more of the functions discussed herein. Similarly, other messaging services may also be utilized, depending on the particular embodiment. Additionally, while organization of data may be described and/or illustrated herein, this is also a nonlimiting example, as other organizations, searches, and/or interfaces may be utilized. As a nonlimiting example, "GoldMine User's Guide," "GoldMine What's New in GoldMine 6.7," and "GoldMine Integration Services for Microsoft Outlook" include exemplary embodiments of organizations, searches, and/or interfaces that may be implemented, and are incorporated by reference in their entireties.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

What is claimed is:

1. A method comprising:
   receiving, via a computing device, a listing from a directory listing subscriber, the listing comprising business contact information related to the directory listing subscriber;
   receiving, via the computing device, a request from a user for the listing;
   providing, by the computing device, the listing to the user;
   receiving, via the computing device from the user, a selection of portions of the business contact information to add to a personal directory associated with the user, wherein the selection further comprises user modifications to the portions of the business contact information, and wherein the personal directory is stored on a device associated with a directory listing service provider;
   adding, by the computing device, the portions of the business contact information and the user modifications to the portions of the business contact information to the personal directory;
   receiving, via the computing device, a first indication from the directory listing subscriber to send data associated with the directory listing subscriber to the personal directory, the data comprising an advertisement related to the directory listing subscriber;
   providing, by the computing device, the advertisement to a device associated with the user;
   receiving, via the computing device, a selection of the advertisement;
   in response to receiving the selection of the advertisement, providing, by the computing device, a plurality of options associated with the advertisement;
   and sending, by the computing device, billing data related to the advertisement to a billing system, wherein the billing data related to the advertisement comprises charges to the directory listing subscriber, and wherein the charges are associated with providing the advertisement to the device associated with the user.

2. The method of claim 1, further comprising facilitating display of a second indication related to the data on the device.

3. The method of claim 2, wherein the second indication comprises a link configured to display the data.

4. The method of claim 1, wherein the data is further associated with a messaging address.

5. The method of claim 4, wherein the data further comprises a message sent to the messaging address.

6. The method of claim 4, wherein the messaging address comprises an instant messaging address.

7. The method of claim 1, further comprising:
   receiving additional information relating to the listing from the user;
   and adding the additional information to the personal directory in association with the portions of the business contact information.

8. A non-transitory computer-readable storage medium having computer-readable instructions stored thereon that, when executed by a processor, cause the processor to perform operation comprising:
   receiving a listing from a directory listing subscriber, the listing comprising business contact information related to the directory listing subscriber; receiving a request from a user for the listing;
   providing the listing to the user; receiving a selection of portions of the business contact information to add to a personal directory associated with the user, wherein the selection further comprises user modifications to the portions of the business contact information, and wherein the personal directory is stored on a device associated with a directory listing service provider;
   adding the portions of the business contact information and the user modifications to the portions of the business contact information to the personal directory;
   receiving a first indication from the directory listing subscriber to send data associated with the directory listing subscriber to the personal directory, the data comprising an advertisement related to the directory listing subscriber;
   providing the advertisement to a device associated with the user;
   receiving a selection of the advertisement;
   in response to receiving the selection of the advertisement, providing a plurality of options associated with the advertisement;
   and sending billing data related to the advertisement to a billing system, wherein the billing data related to the advertisement comprises charges to the directory listing subscriber, and wherein the charges are associated with providing the advertisement to the device associated with the user.

9. The non-transitory computer-readable storage medium of claim 8, having further computer-readable instructions stored thereon that, when executed by a processor, cause the processor to perform operation comprising displaying a second indication related to the data on the device.

10. The non-transitory computer-readable storage medium of claim 9, wherein the second indication comprises a link configured to display the data.

11. The non-transitory computer-readable storage medium of claim 8, wherein the data is further associated with a messaging address.

12. The non-transitory computer-readable storage medium of claim 11, wherein the data further comprises a message sent to the messaging address.

13. The non-transitory computer-readable storage medium of claim 11, wherein the messaging address comprises an instant messaging address.

14. A computer system comprising:
a processor;
and a memory storing a program comprising instructions that, when executed by the processor, cause the processor to perform operations comprising:
receiving a listing from a directory listing subscriber, the listing comprising business contact information related to the directory listing subscriber,
receiving a request from a user for the listing,
providing the listing to the user,
receiving a selection of portions of the business contact information to add to a personal directory associated with the user, wherein the selection further comprises user modifications to the portions of the business contact information, and wherein the personal directory is stored on a device associated with a directory listing service provider,
adding the portions of the business contact information and the user modifications to the portions of the business contact information to the personal directory,
receiving a first indication from the directory listing subscriber to send data associated with the directory listing subscriber to the personal directory, the data comprising an advertisement related to the directory listing subscriber,
providing the advertisement to a device associated with the user, receiving a selection of the advertisement,
in response to receiving the selection of the advertisement, providing a plurality of options associated with the advertisement, and
sending billing data related to the advertisement to a billing system, wherein the billing data related to the advertisement comprises charges to the directory listing subscriber, and wherein the charges are associated with providing the advertisement to the device associated with the user.

15. The system of claim 14, wherein the program comprises further instructions that, when executed by the processor, cause the processor to perform operations comprising displaying a second indication related to the data on the device.

16. The system of claim 15, wherein the second indication comprises a link configured to display the data.

17. The system of claim 14, wherein the data is further associated with a messaging address.

18. The system of claim 17, wherein the data further comprises a message sent to the messaging address.

19. The system of claim 17, wherein the messaging address comprises an instant messaging address.

20. The system of claim 14, wherein the program comprises further instructions that, when executed by the processor, cause the processor to perform operations comprising:
receiving additional information relating to the listing from the user;
and adding the additional information to the personal directory in association with the portions of the business contact information.

\* \* \* \* \*